US012031703B2

(12) United States Patent
Robota et al.

(10) Patent No.: US 12,031,703 B2
(45) Date of Patent: Jul. 9, 2024

(54) LINEAR LUMINAIRE CONNECTOR ASSEMBLY

(71) Applicant: SIGNIFY HOLDING B.V., Eindhoven (NL)

(72) Inventors: Andrew L. Robota, Eindhoven (NL); Steven Russell Clements, Eindhoven (NL); Scott Peter Formel, Eindhoven (NL); Anthony Reale, Eindhoven (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/233,412

(22) Filed: Aug. 14, 2023

(65) Prior Publication Data

US 2023/0383933 A1 Nov. 30, 2023

Related U.S. Application Data

(63) Continuation-in-part of application No. 17/625,471, filed as application No. PCT/EP2020/069170 on Jul. 8, 2019.

(60) Provisional application No. 62/872,570, filed on Jul. 10, 2019.

(51) Int. Cl.

| | |
|---|---|
| ***F21V 21/108*** | (2006.01) |
| ***F21V 21/008*** | (2006.01) |
| ***F21Y 103/00*** | (2016.01) |

(52) U.S. Cl.
CPC .......... *F21V 21/108* (2013.01); *F21V 21/008* (2013.01); *F21Y 2103/00* (2013.01)

(58) Field of Classification Search
CPC ... F21V 21/108; F21V 21/008; F21Y 2103/00
See application file for complete search history.

(56) References Cited

U.S. PATENT DOCUMENTS 3,840,842 A * 10/1974 Gabryelewicz ......... F21V 23/06 439/639

FOREIGN PATENT DOCUMENTS

| | | | |
|---|---|---|---|
| DE | 102010039673 | A1 | 3/2012 |
| DE | 202014104847 | U1 | 12/2014 |
| DE | 202016107013 | U1 | 12/2016 |
| KR | 101185253 | B1 | 9/2012 |
| WO | 2013087745 | A1 | 6/2013 |

* cited by examiner

*Primary Examiner* — Mary Ellen Bowman

(57) ABSTRACT

The present disclosure is a linear luminaire connector assembly that is configured to connect linear luminaires in a desired geometric arrangement. The connector assembly provides modularity in the arrangement of two or more linear luminaires. The connector assembly provides connection points to which linear luminaires can Connect such that the linear luminaires are arranged around the connector assembly in different directions to form any appropriate pattern of a user's choice. Further, the connector assembly is configured to house one or more electronic components/ devices therein, such as IOT devices, sensors, cameras, emergency battery packs, wireless communication modules.

12 Claims, 27 Drawing Sheets

LINEAR LUMINAIRE CONNECTOR ASSEMBLY

TECHNICAL FIELD

Embodiments of the present disclosure relate generally to luminaires, and more particularly to a linear luminaire connector assembly.

BACKGROUND

Typically, linear luminaires are limited to a continuous long run arrangement where two or more linear luminaires are connected end-to-end to form a continuous row. Connectors that allow the linear luminaires to be connected in other different patterns do exist, however, their configurability is limited. Additionally, existing connectors are limited in that they are configured to be used only as connection points or junctions for connecting linear luminaires and for routing wires to the luminaires connected thereto. The existing connectors are not configured to house any accessories or other electronic components such as sensors, cameras, speakers, etc.

This background information is provided to reveal information believed to be of possible relevance to the present disclosure. No admission is necessarily intended, nor should be construed, that any of the preceding information constitutes prior art against the present disclosure.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 27:
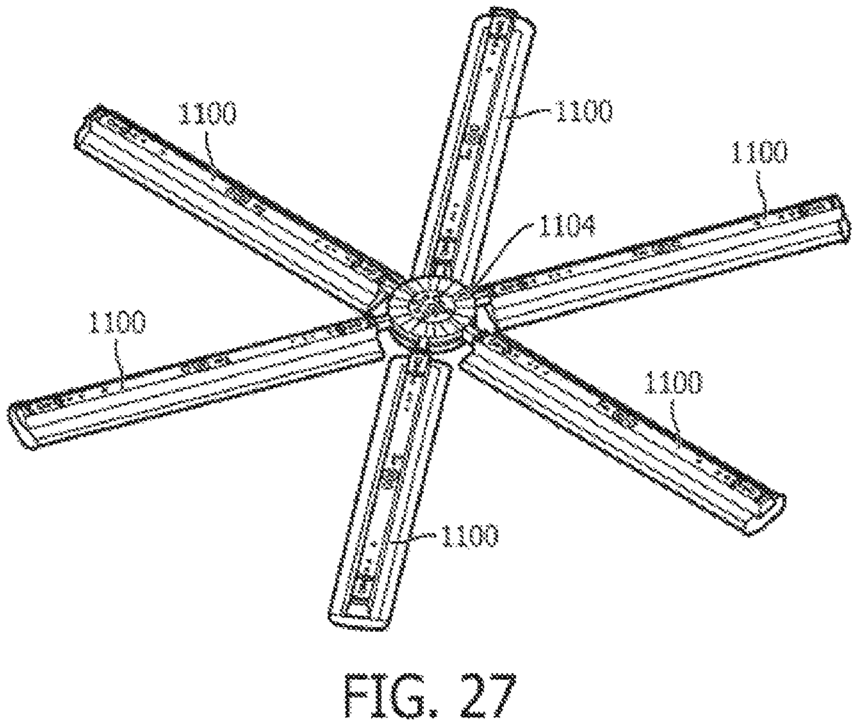
Figure 28:
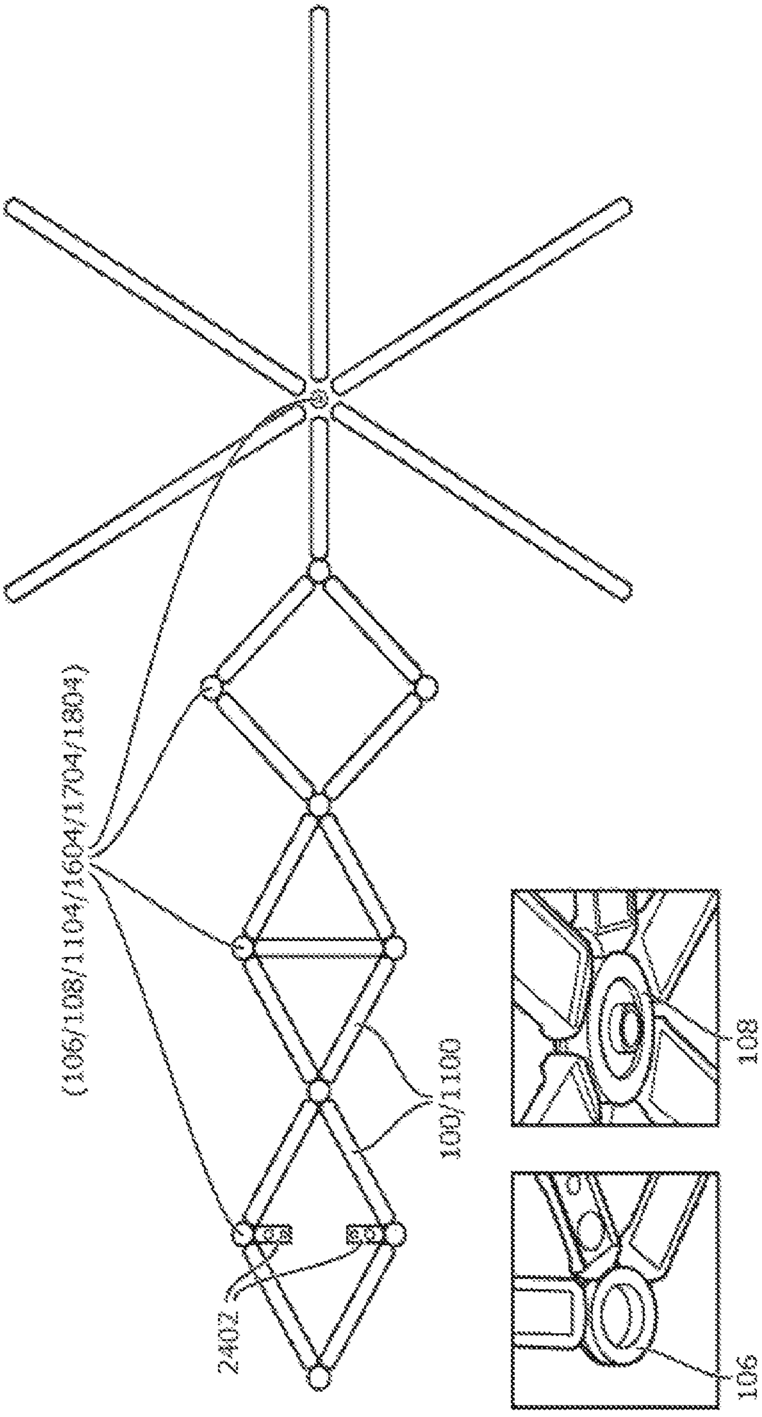
Figure 29:
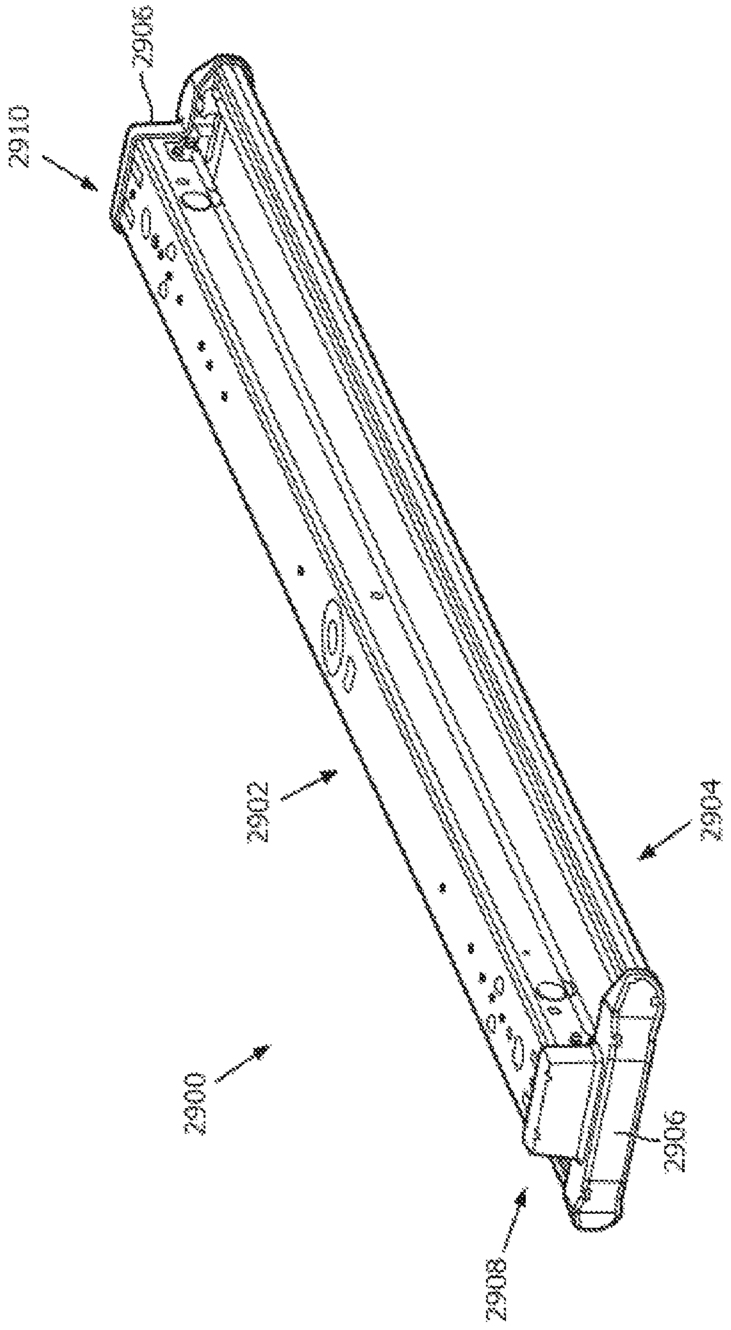
Figure 30:
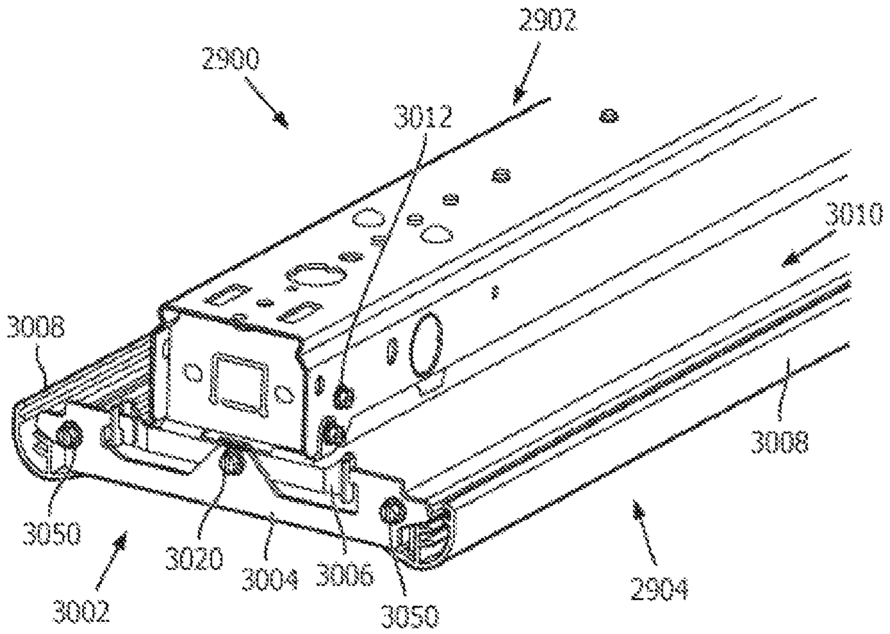
Figure 31:
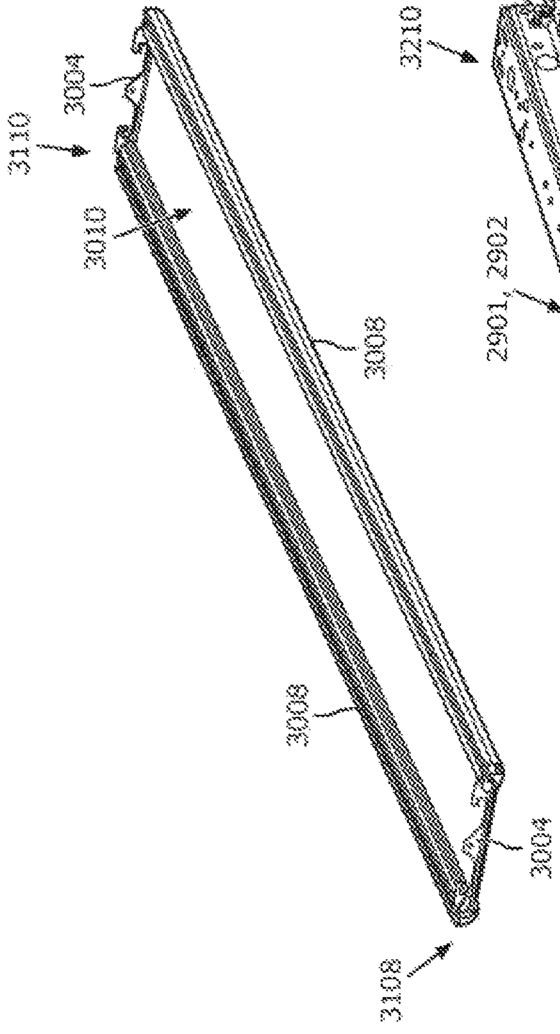
Figure 32:
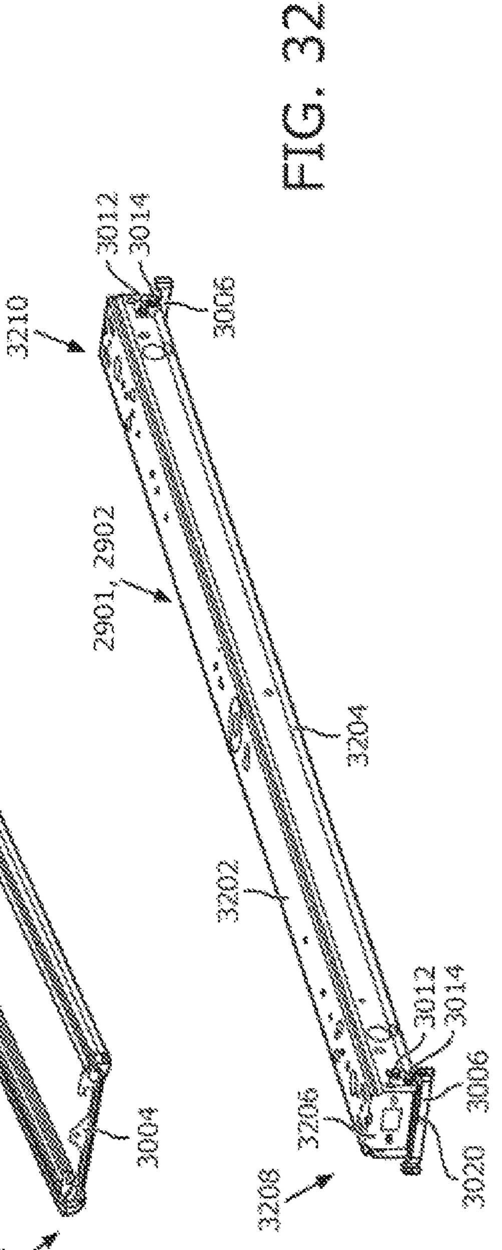
Figure 33:
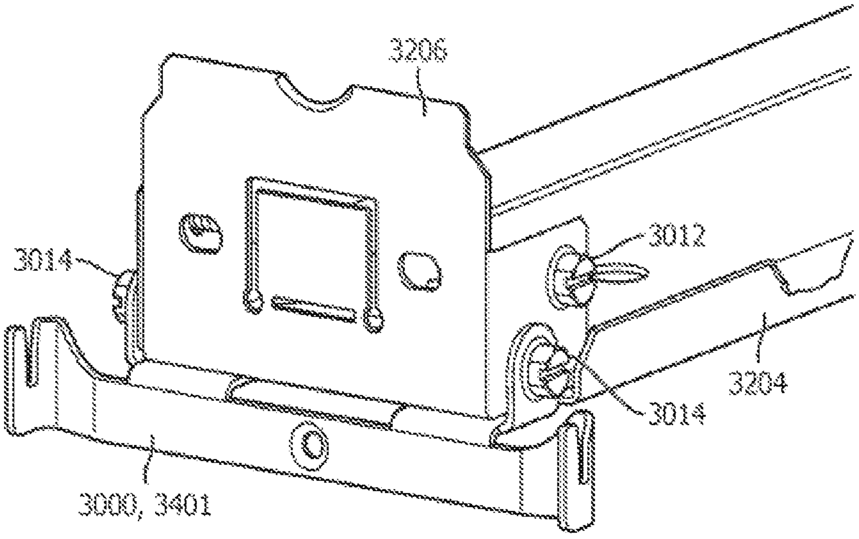
Figure 34:
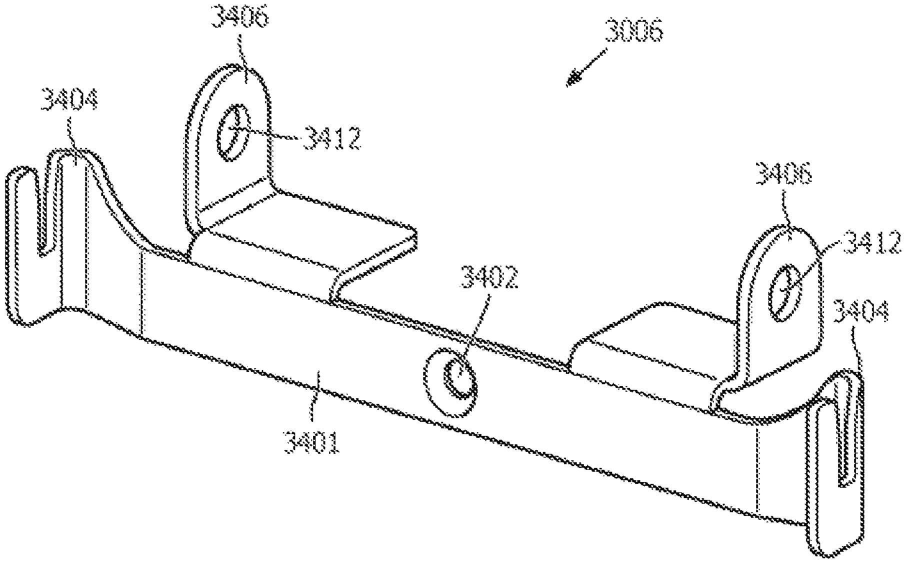
Figure 35:
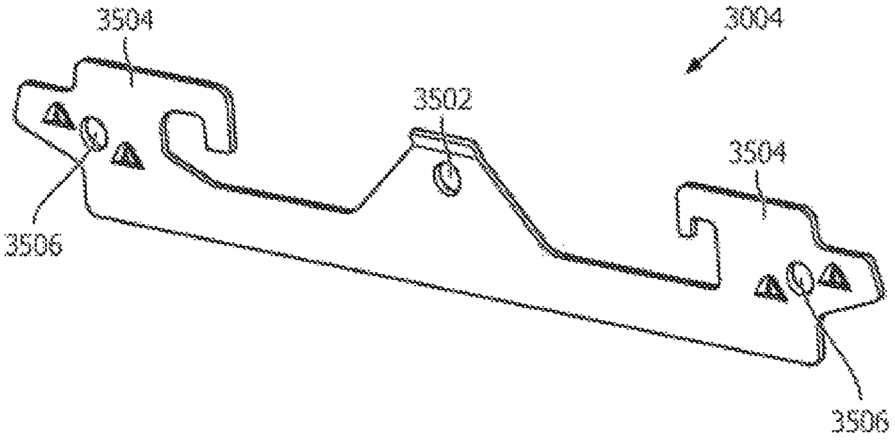
Figure 36:
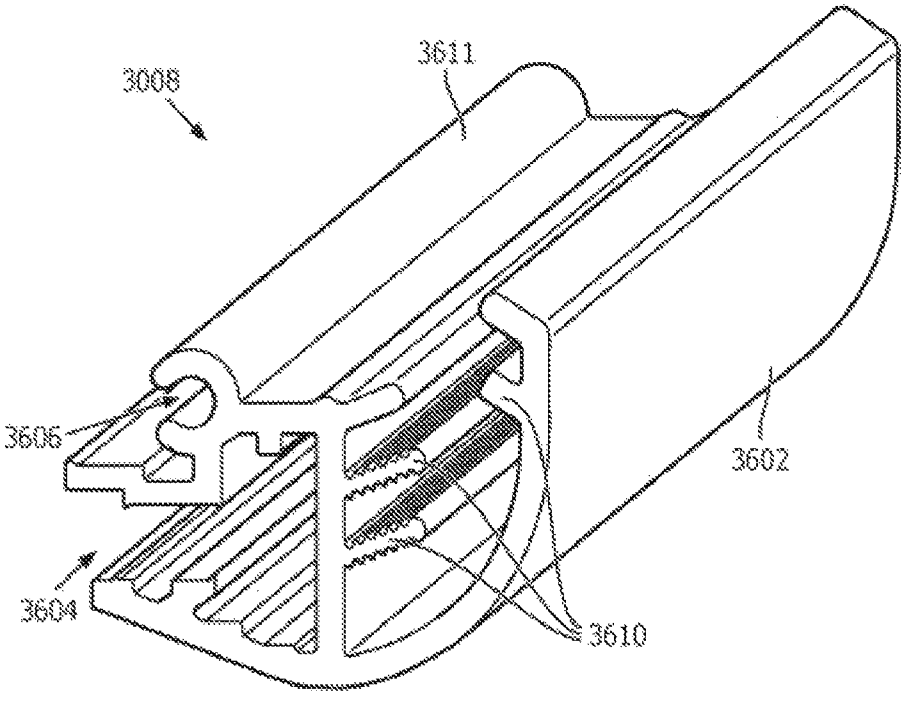
Figure 37:
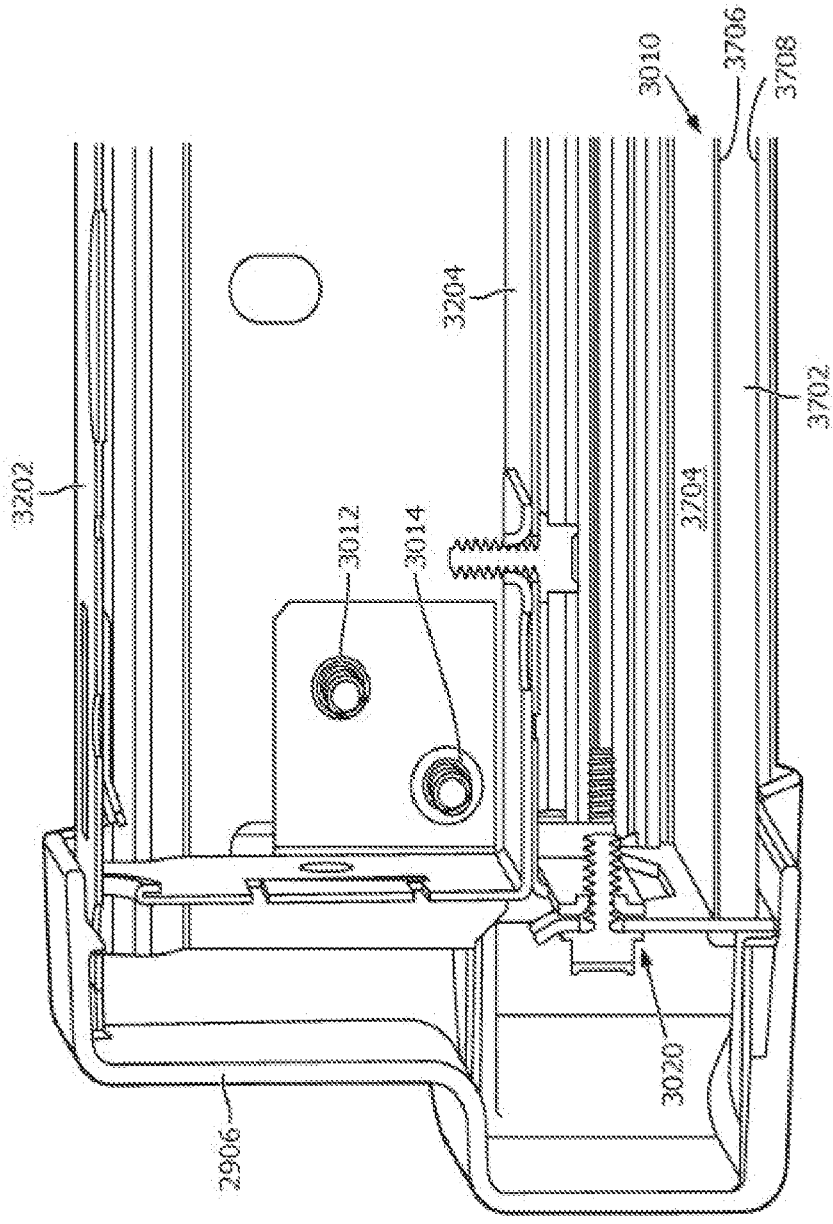
Figure 38:
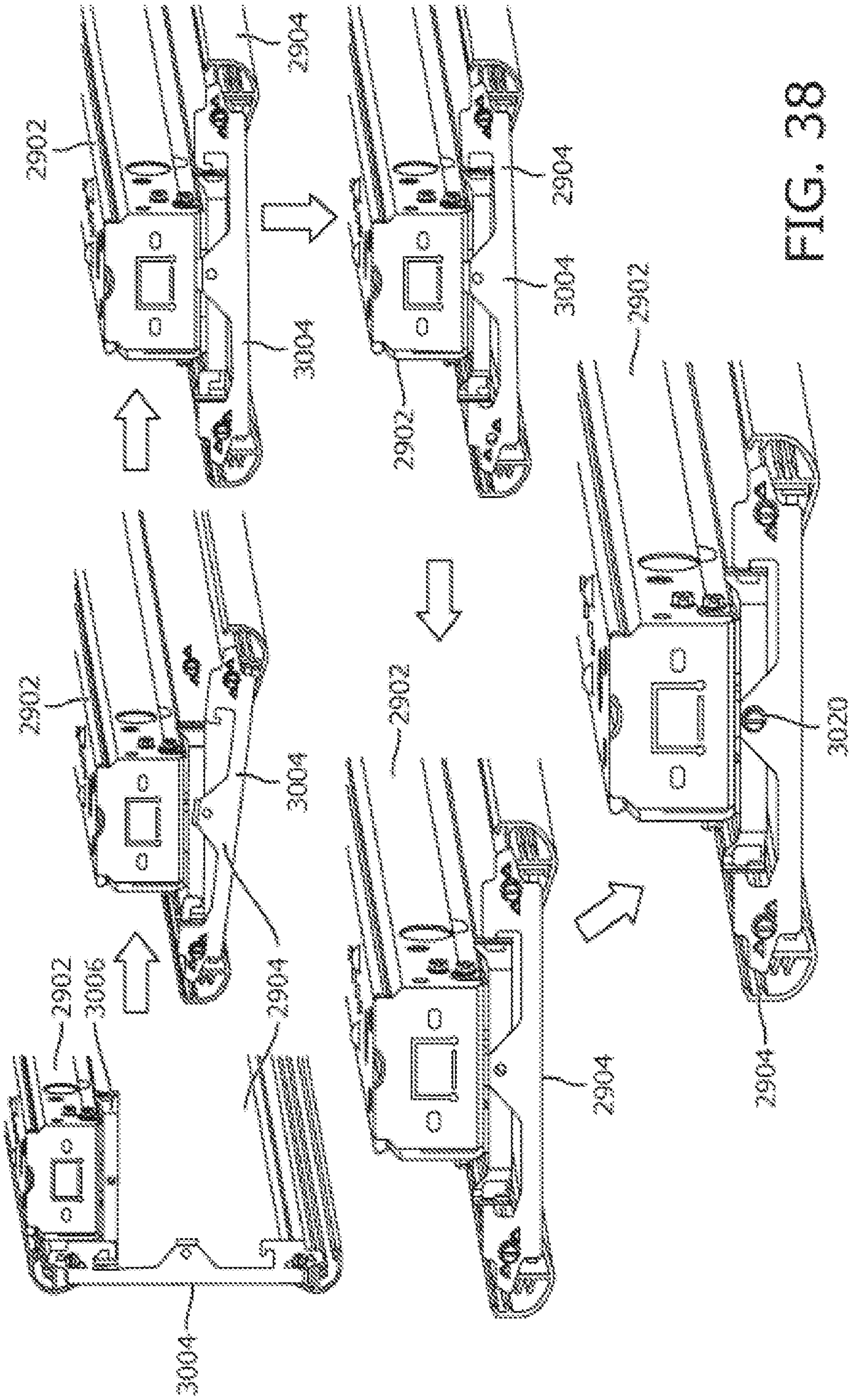
Figure 39:
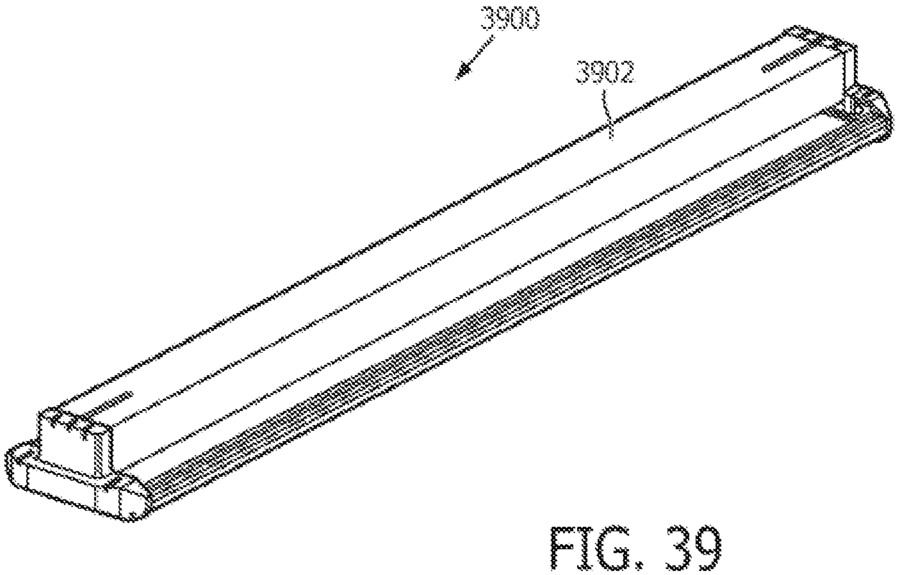
Figure 40:
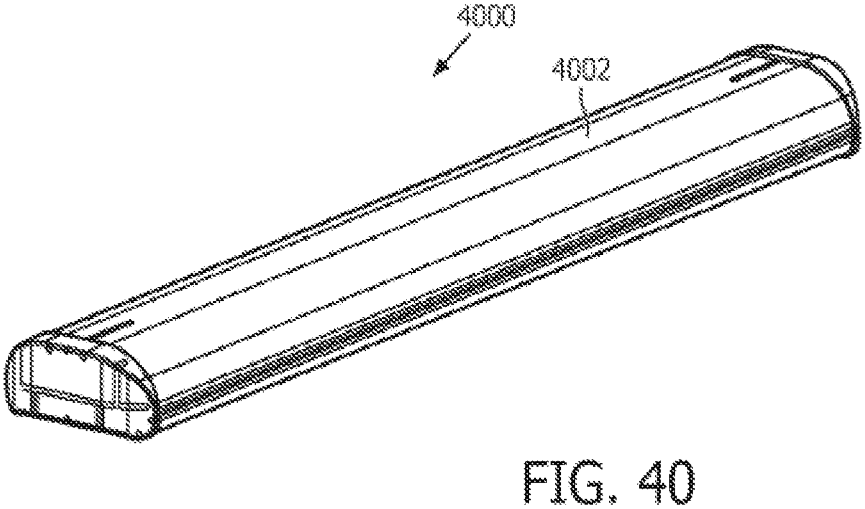
Figure 41:
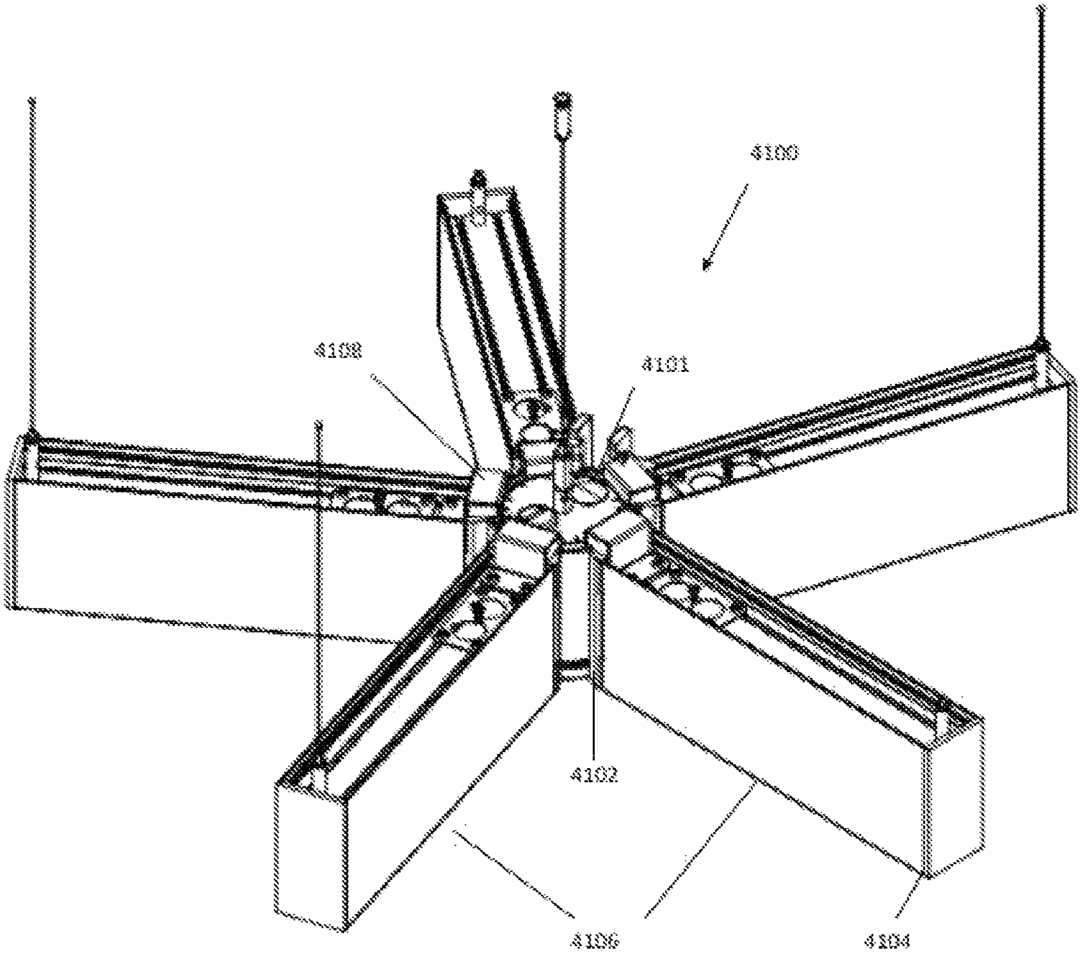
Figure 42:
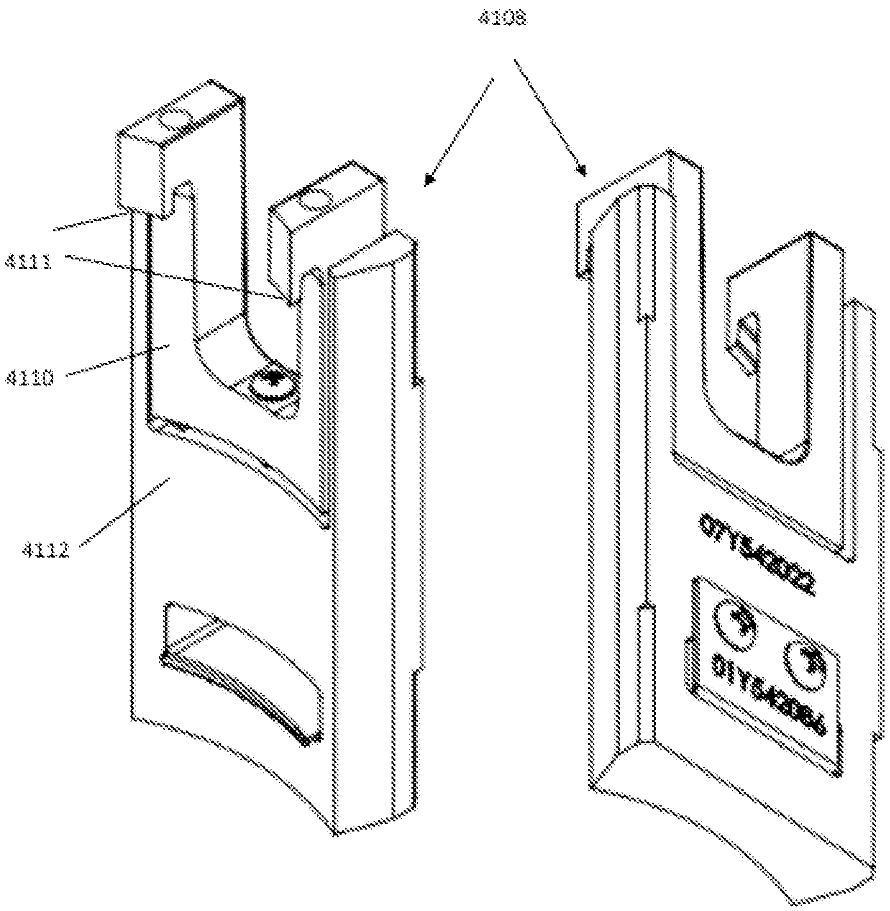
Figure 43:
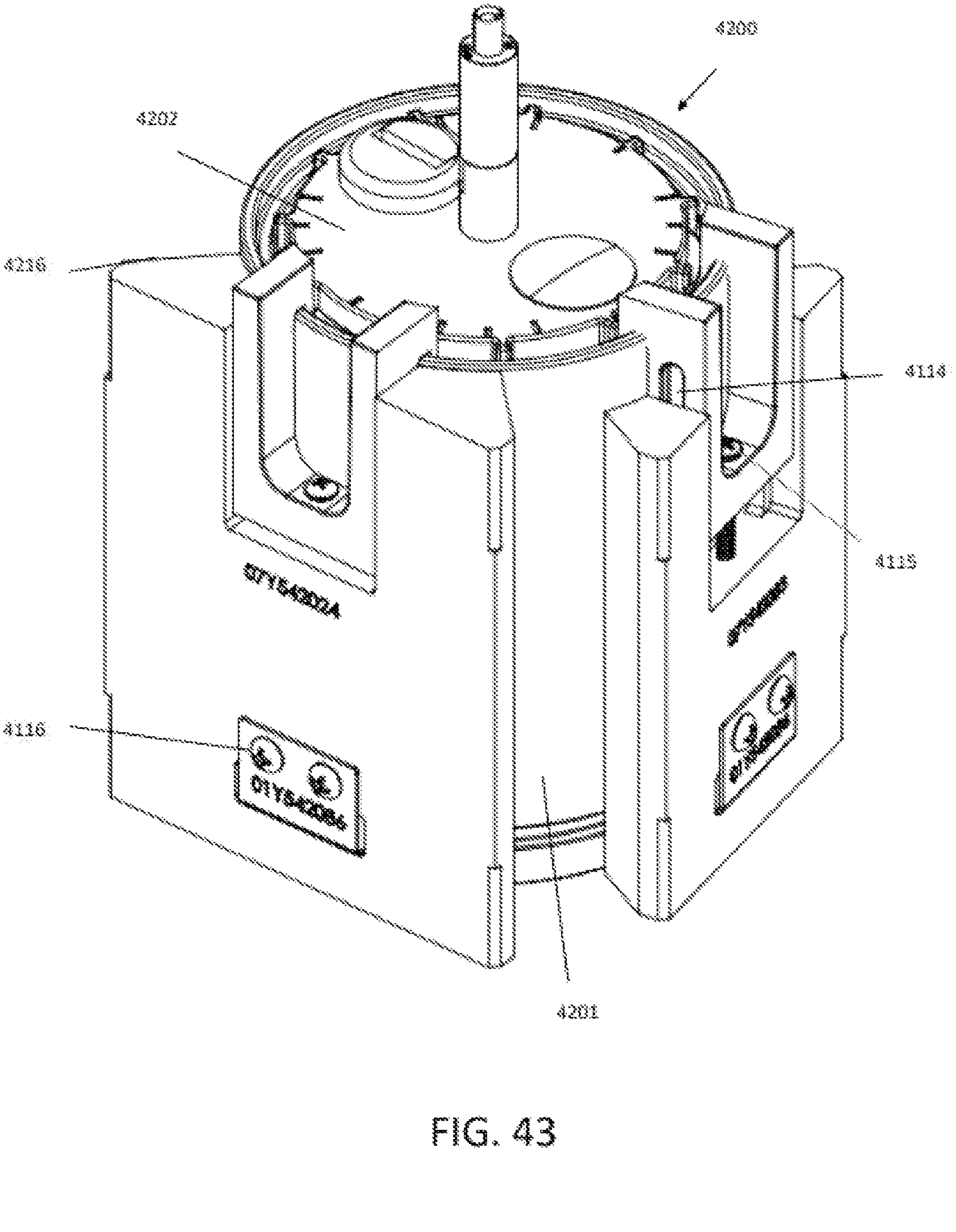

with the first example linear luminaire, in accordance with example embodiments of the present disclosure;

FIG. 27 illustrates a first example arrangement of six of the second example linear luminaires connected to the third example connector assembly, in accordance with example embodiments of the present disclosure;

FIG. 28 illustrates a second example arrangement of a plurality of linear luminaires using multiple connector assemblies, in accordance with example embodiments of the present disclosure;

FIG. 29 illustrates a third example linear luminaire with example hinge installation features, in accordance with example embodiments of the present disclosure;

FIG. 30 is an enlarged view of an end portion of the third example linear luminaire with the end cap having been removed to illustrate the example hinge installation features, in accordance with example embodiments of the present disclosure;

FIG. 31 illustrates a lightguide assembly of the third example linear luminaire with a lightguide hinge bracket, in accordance with example embodiments of the present disclosure;

FIG. 32 illustrates a channel assembly of the third example linear luminaire with a channel hook bracket, in accordance with example embodiments of the present disclosure;

FIG. 33 is an enlarged view of an end portion of the channel assembly without a top channel cover, in accordance with example embodiments of the present disclosure;

FIG. 34 illustrates a perspective view of the channel hook bracket, in accordance with example embodiments of the present disclosure;

FIG. 35 illustrates a perspective view of the lightguide hinge bracket, in accordance with example embodiments of the present disclosure;

FIG. 36 illustrates a perspective view of the side rail of the lightguide assembly, in accordance with example embodiments of the present disclosure;

FIG. 37 illustrates an enlarged view of a portion of a cross-section of the third example linear luminaire, in accordance with example embodiments of the present disclosure;

FIG. 38 illustrates an installation of the third example linear luminaire using the example hinge installation features, in accordance with example embodiments of the present disclosure;

FIG. 39 illustrates a fourth example linear luminaire, in accordance with example embodiments of the present disclosure; and FIG. 40 illustrates a fifth example linear luminaire, in accordance with example embodiments of the present disclosure;

FIG. 41 illustrates an example arrangement of five of a sixth example linear luminaires connected to a seventh example connector assembly, in accordance with example embodiments of the present disclosure;

FIG. 42 illustrates a perspective view of a third example coupling bracket that is used to connect the sixth example linear luminaire to the seventh example connector assembly, in accordance with example embodiments of the present disclosure;

FIG. 43 illustrates a perspective view of the third example coupling bracket coupled to the seventh example connector assembly, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis is instead placed on clearly illustrating the principles of the example embodiments. Additionally, certain dimensions or positions shown in the drawings may be exaggerated to help visually convey such principles.

DETAILED DESCRIPTION OF EXAMPLE EMBODIMENTS

The present disclosure describes a linear luminaire connector assembly (hereinafter 'connector assembly') that is configured to connect linear luminaires in a desired geometric arrangement. The geometric arrangement may include a linear arrangement, a substantially perpendicular arrangement, and/or an arrangement of multiple angles such as reflex, obtuse, acute, etc. That is, the connector assembly of the present disclosure provides modularity in the arrangement of two or more linear luminaires. The connector assembly of the present disclosure provides connection points to which linear luminaires can connect such that the linear luminaires are arranged around the connector assembly in different directions to form any appropriate pattern of a user's choice. Further, the connector assembly of the present disclosure is configured to house one or more electronic components/devices therein, such as IOT devices, sensors, cameras, emergency battery packs, wireless communication modules, etc. One of skill in the art can understand and appreciate that both the linear luminaire and the connector assembly are configured to be suspension mounted or surface mounted such that the connector assembly does not have to bear the load or weight of the linear luminaire when the linear luminaire is coupled to the connector assembly.

Figure 1:
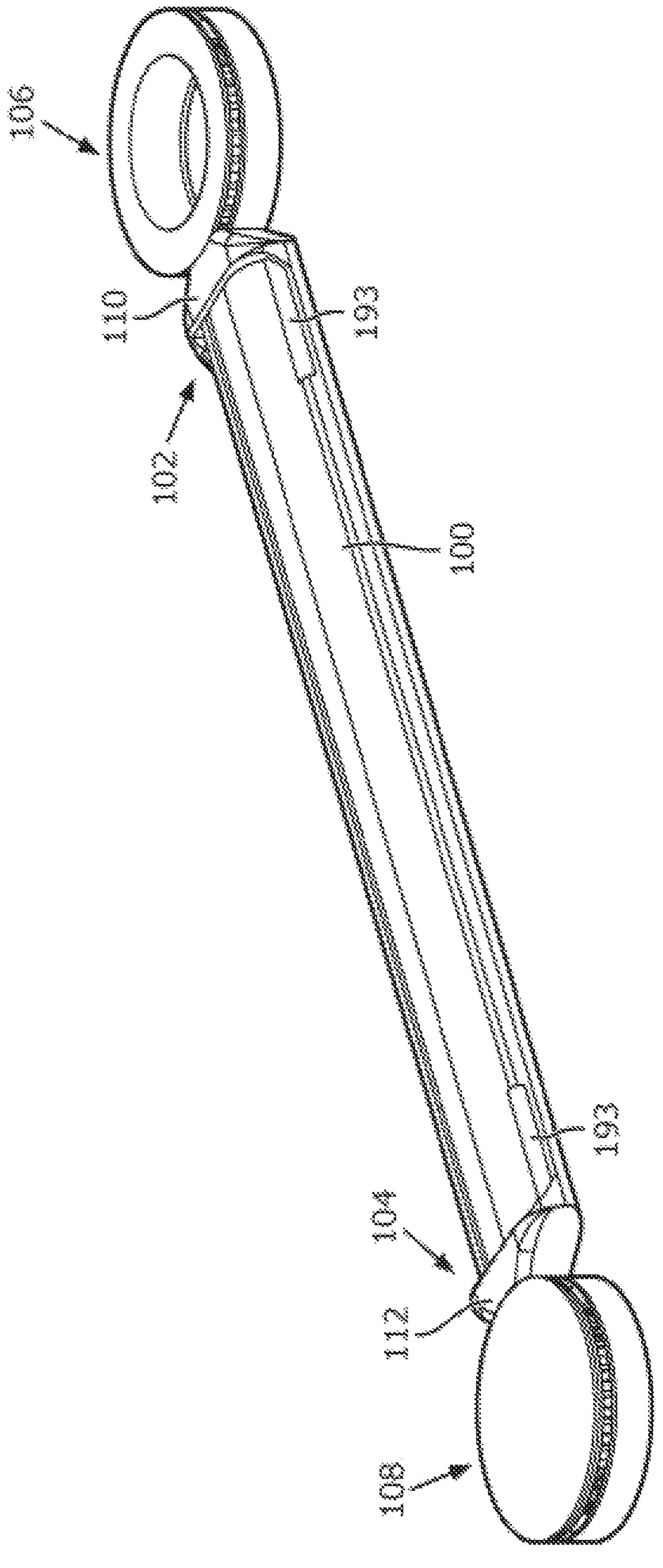
FIG. 1 illustrates a perspective view of a first example linear luminaire that is connected to a first example connector assembly at one end and a second example connector assembly at a second end, in accordance with example embodiments of the present disclosure.
Figure 2:
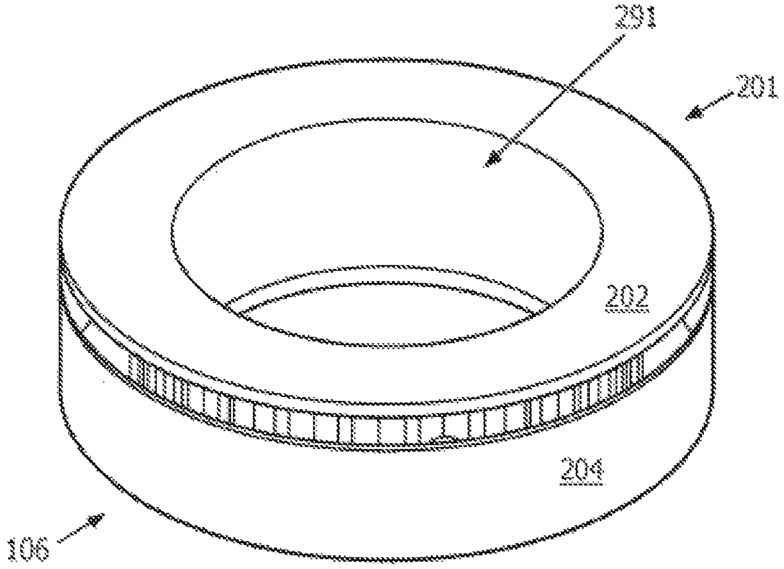
FIG. 2 illustrates a perspective view of the first example connector assembly, in accordance with example embodiments of the present disclosure.
Figure 3:
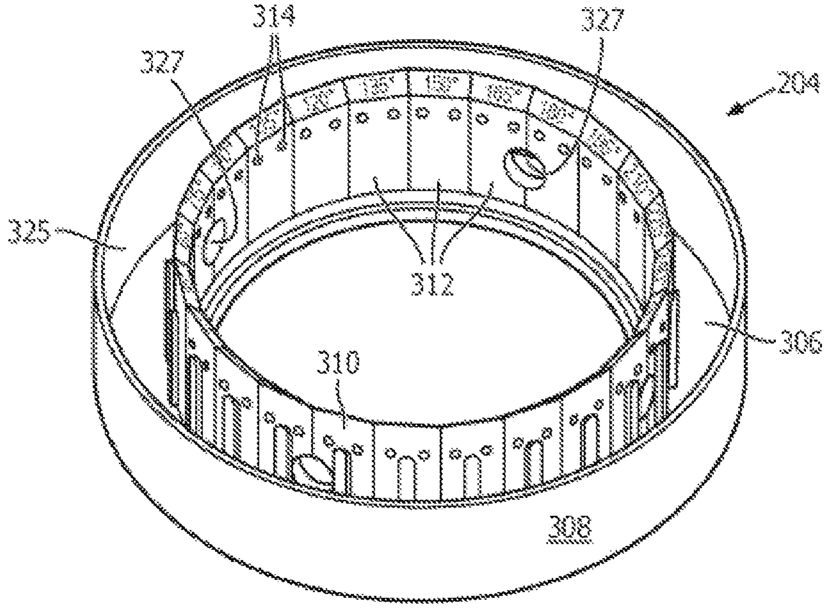
FIG. 3 illustrates a perspective view of a bottom member of the first example connector assembly, in accordance with example embodiments of the present disclosure.
Figure 4:
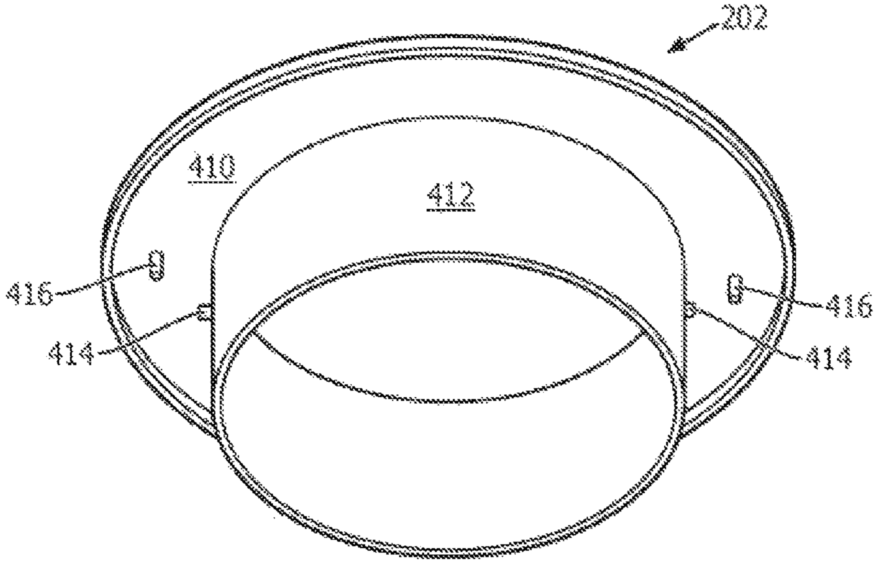
FIG. 4 illustrates a perspective view of a top member of the first example connector assembly, in accordance with example embodiments of the present disclosure.
Figure 5:
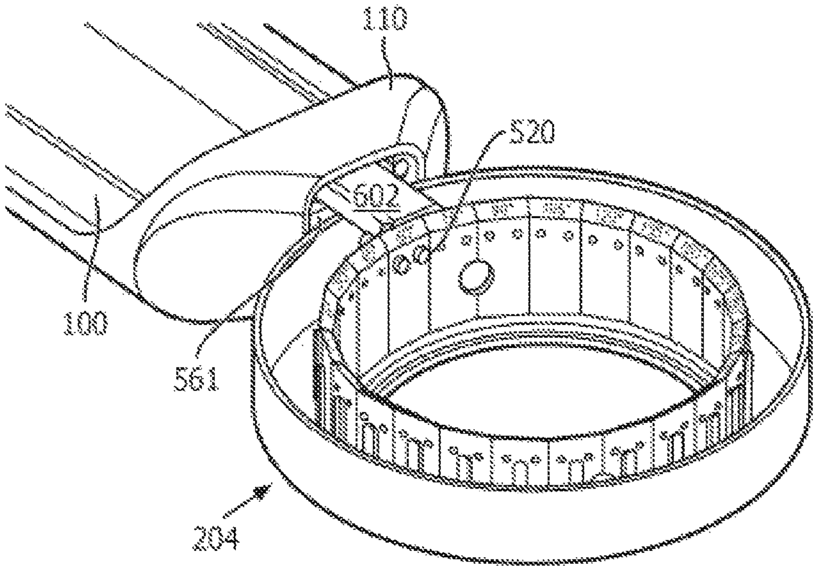
FIG. 5 is an enlarged view of a portion of the first example linear luminaire of FIG. 1 that is connected to the first example connector assembly with the end cap of the first example linear luminaire and the top member of the first example connector assembly removed therefrom to illustrate how the first example linear luminaire connects to the first example connector assembly, in accordance with example embodiments of the present disclosure.
Figure 6:
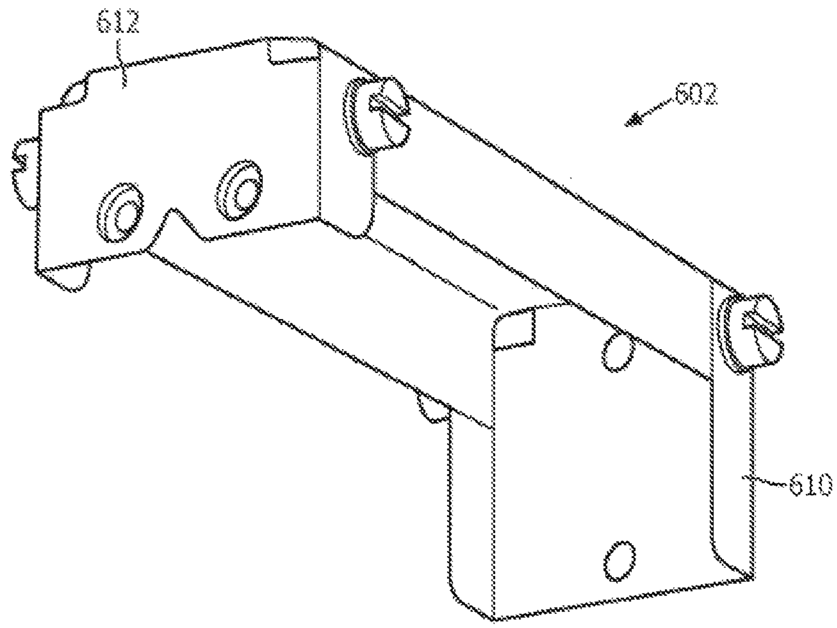
FIG. 6 illustrates a perspective view of a first example coupling bracket that is used to connect the first example linear luminaire to the first example connector assembly, in accordance with example embodiments of the present disclosure.

Turning now to the figures, example embodiments of a connector assembly will be described in association with FIGS. 1-28. Referring to FIG. 1, a modular linear luminaire 100 may be configured to be coupled to a connector assembly at each lateral end (102, 104) thereof. For example, the modular linear luminaire 100 may be coupled to a first example connector assembly 106 at a first lateral end 102 and a second example connector assembly 108 at the second lateral end 104. The modular linear luminaire 100 may be coupled to the connector assemblies (106, 108) using coupling brackets, such as the example coupling brackets (602, 1202) illustrated in FIGS. 6 and 12. The end caps (110, 112) of the modular linear luminaire 100 that are disposed at the opposite lateral ends (102, 104) thereof may have appropriate through apertures 561 (shown in FIG. 5) formed therein to create a passage for the coupling brackets (602, 1202) to extend therethrough. In addition to coupling the modular linear luminaire 100 to the connector assembly (106 or 108), the coupling brackets (602, 1202) may be configured to create a concealed (or open) wireway for routing electrical conductors (e.g., electrical wires) between the modular linear luminaire 100 and the connector assembly (106 or 108). In some example embodiments such as the ones in which the coupling bracket 602 is used, the concealed wireway may be created by a combination of the coupling bracket 602 and the end cap (110 or 112) operating in concert.

Even though FIG. 1 illustrates two different connector assemblies being coupled to the opposite lateral ends (102, 104) of the modular linear luminaire 100, one of skill in the art can understand and appreciate that in other example embodiments, similar connector assemblies may be coupled to the opposite lateral ends (102, 104) of the modular linear luminaire 100. Further, even though FIG. 1 illustrates the modular linear luminaire 100 being coupled to two connector assemblies, i.e., one connector assembly at each lateral end thereof, one of skill in the art can understand that in other example embodiments, the modular linear luminaire 100 may be coupled to only one connector assembly without departing from a broader scope of the present disclosure. Furthermore, the example modular linear luminaire 100 illustrated in FIG. 1 is non-limiting, and other example modular linear luminaires such as the modular linear luminaire 1100 in FIGS. 11, 18, 22, 23, 27 and 41 are within the broader scope of the present disclosure. That is, the different connector assemblies described herein may be configured to connect any appropriate linear luminaires thereto without departing from a broader scope of the present disclosure.

The first example connector assembly 106 that is illustrated in FIG. 1 may be an open connector assembly that comprises a central opening 291 that extends therethrough. The first example connector assembly 106 will be described below in further detail in association with FIGS. 2-7. Referring to FIGS. 2-7, the first example connector assembly 106 may include a housing 201. The housing 201 may include a bottom member 204 and a top member 202 that is coupled thereto. The bottom member 204 forms a structural mount for the modular linear luminaires (100, 1100) (hereinafter 'linear luminaires'). That is, the linear luminaires (100, 1100) may be coupled to the bottom member 204 of the first example connector assembly 102 using the coupling brackets (602, 1202). For example, one end (610, 1210) of the coupling bracket (602, 1202) may be coupled to an end plate 2302 (shown in FIG. 23) or T-bridge 702 (shown in FIG. 7) of the linear luminaire (100, 1100) that is disposed at the lateral end (102, 104) thereof, and the opposite end (612, 1212) of the coupling bracket (602, 1202) may be coupled to the bottom member 204 of the first example connector assembly 106 using fasteners 520 (e.g., screws).

Even though the present disclosure describes the coupling bracket (602, 1202) being coupled to the linear luminaire (100, 1100) and the connector assembly, e.g., first example connector assembly 106 using fasteners, one of skill in the art can understand and appreciate that the coupling brackets may be coupled to the linear luminaire and the connector assembly using any other appropriate coupling mechanisms without departing from a broader scope of the present disclosure.

The bottom member 204 may include an annular base 306, an outer wall 308 that extends substantially perpendicular to the annular base 306 from an outer perimeter of the annular base 306, and an inner wall 310 that extends substantially perpendicular to the annular base 306 from an inner perimeter of the annular base 306. The inner wall 310 may be taller than the outer wall 308 and may comprise a plurality of flat surfaces 312 disposed radially around the inner wall 310 at N° increments. In the example embodiment illustrated in FIG. 5, the inner wall 310 may include twenty four flat surfaces disposed at 150 increments. Further, each flat surface may include a pair of mounting apertures 314 that are configured to receive fasteners 520 therethrough to couple the coupling bracket (602, 1202) to the bottom member 204 of the connector assembly, e.g., first example connector assembly 106.

The twenty four flat surfaces 312 and the respective mounting aperture pairs 314 formed therein provide twenty four different mounting points for a linear luminaire (100, 1100) to be coupled to the connector assembly 106. Additionally, the twenty four flat surfaces 312 and the respective mounting aperture pairs 314 formed therein allow multiple linear luminaires to be connected thereto and arranged in different geometric patterns, e.g., a maximum of twenty four different linear luminaires to be connected to the connector assembly 106 provided the size (e.g., width) of the linear luminaires allow the maximum number of linear luminaires to be coupled thereto. Example geometric patterns in which the linear luminaires can be arranged using the first example connector assembly 106 (or other appropriate example connector assemblies (illustrated in FIGS. 1, 11, 16, 17, 18, 42 and 43) are illustrated in FIGS. 27, 28 and 41. The example geometric patterns shown in FIGS. 27, 28 and 41 are not limiting and one of skill in the art can understand and appreciate that the linear luminaires can be arranged in any other appropriate patterns using the one or more connector assemblies (106, 108, 1104, 1604, 1704, 1804, 4200) without departing from a broader scope of the present disclosure.

In addition to providing mounting points for the linear luminaires (100, 1100), the bottom member 204 of the first example connector assembly 106 may provide a wire cavity 325 for routing electrical conductors associated with the different linear luminaires (100, 1100) that are connected thereto. The wire cavity 325 may comprise the annular base 306, the outer wall 308, and the inner wall 310.

The top member 202 of the first example connector assembly 106 may include an annular top wall 410 and a side wall 412 that extends substantially perpendicular to the top wall 410 from an inner perimeter of the annular top wall 410. Further, the top member 202 may include snap tabs 414 that extends radially outward from the side wall 412 and alignment tabs 416 that extend down from the annular top wall 410. The top member 202 is configured to snap into the bottom member 204 of the first example connector assembly 106 by engaging the snap tabs 414 with un-utilized mounting apertures 314 in the inner wall 310 of the bottom member 204. The alignment tabs 416 may be configured to prevent a user from trying to locate the snap tabs 414 in an unavailable mounting aperture 314. The top member 202 may be snapped into the bottom member 204 of the first example connector assembly 106 after the coupling bracket (602, 1202) is coupled to the bottom member 204.

In addition to the flat surfaces 312 and the mounting apertures 314, the inner wall 310 of the bottom member 204 of the first example connector assembly 106 may include routing openings 327 that are configured to route electrical conductors to the wire cavity 325. The use of the routing openings 327 may be more evident in the second example connector assembly 108. For example, the routing openings 327 may be configured to align with corresponding routing openings or knockouts 927 (shown in FIG. 9) in the top member 902 of a second example connector assembly 108 such that electrical conductors from electronic components housed in the top member 902 of the second example connector assembly 108 may be routed to the wire cavity 325 of the second example connector assembly 108 via the aligned routing openings (327, 927), and from the wire cavity 325 to the linear luminaires (100, 1100) coupled to the second example connector assembly 108 through the wireways formed by the coupling brackets (602, 1202).

Figure 8:
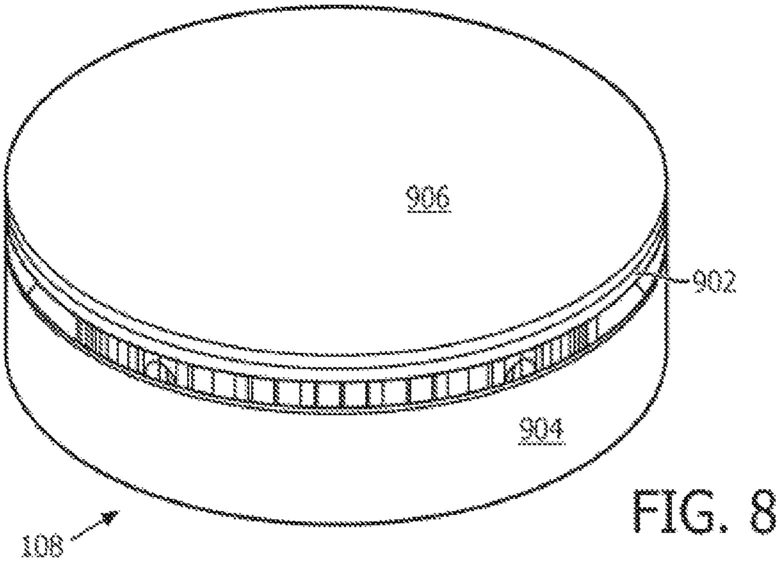
FIG. 8 illustrates a perspective view of the second example connector assembly, in accordance with example embodiments of the present disclosure.
Figure 9:
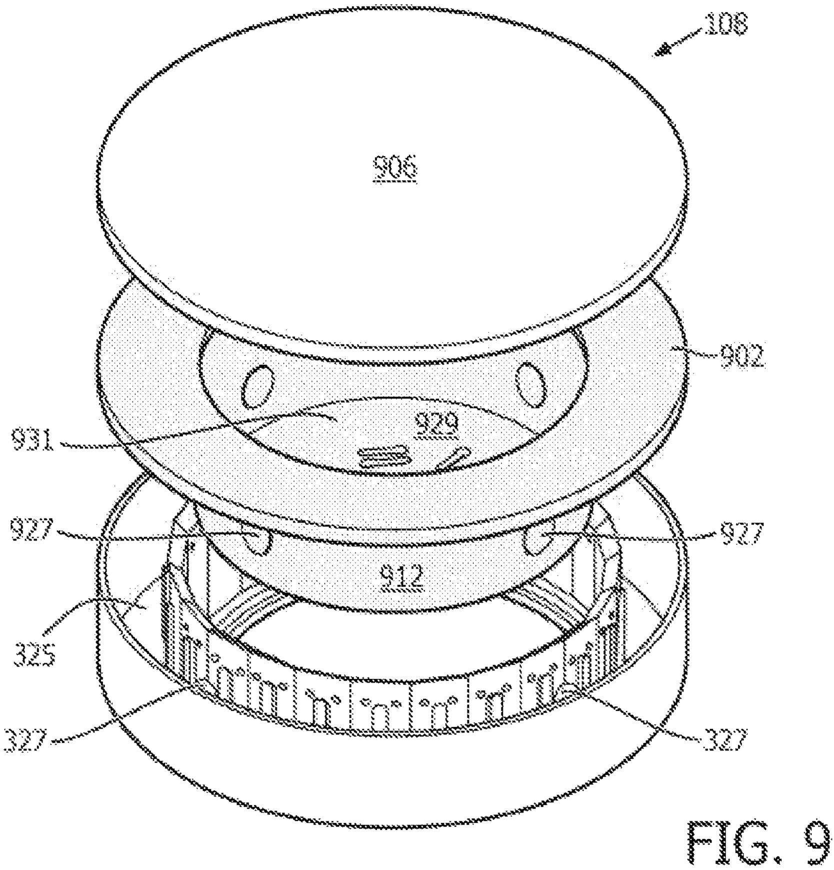
FIG. 9 illustrates an exploded view of the second example connector assembly, in accordance with example embodiments of the present disclosure.
Figure 10:
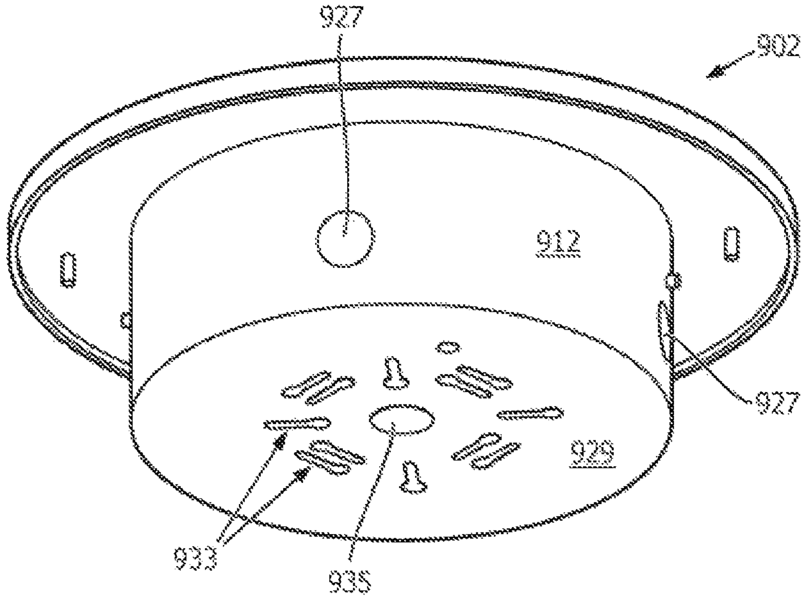
FIG. 10 illustrates a perspective view of a top member of the second example connector assembly, in accordance with example embodiments of the present disclosure.

Referring to FIGS. 8-10, the second example connector assembly 108 may be a closed connector assembly that is different from an open connector assembly (e.g., the first example connector assembly 106) in that the closed connector assembly does not have a central through opening 291 that extends therethrough and the closed connector assembly may be configured to house electronic components therein. The electronic components (e.g., electronic components 1535) described herein may include, but are not limited to, IoT (Internet of Things) devices, sensors, cameras, emergency battery packs, drivers, speakers, microphones, smart speakers (like Alexa), etc.

The second example connector assembly 108 may include a bottom member 904, a top member 902 that snaps into the bottom member 904, and a top cover 906 that snaps to the top member 904. The bottom member 904 of the second example connector assembly 108 may be substantially similar to the bottom member 204 of the first example connector assembly 106. As such, the bottom member 904 of the second example connector assembly 108 will not be described in detail herein for the sake of brevity. Further, the top member 902 of the second example connector assembly 108 may be substantially similar to the top member 202 of the first example connector assembly 106 except that the top member 902 of the second example connector assembly 108 may include a bottom wall 929 that defines an accessory cavity 931 in concert with the side wall 912 of the top member 902. The accessory cavity 931 may be configured to house one or more electronic components therein. The bottom wall 929 may further include a plurality of mounting apertures 933 that are configured to mount different types of junction boxes and/or provide mounting points for surface mount features to surface mount the second example connector assembly 108. Additionally, the bottom wall 929 may include a sensor opening 935 that is configured to receive a portion of a sensor (e.g., lens of a motion sensor, etc.) therethrough. As described above, the side wall 912 of the top member 902 may include knockouts 927 that are detachable to create openings for porting electrical conductors from the electronic components housed in the accessory cavity 931 of the top member 902 to the wire cavity 325 of the bottom member 904 of the second example connector assembly 108.

The top cover 906 may include coupling tabs or ribs (not shown) that are configured to engage with corresponding grooves (not shown) in the top member 902 to couple the top cover 906 to the top member 902. The top cover 906 is configured to conceal the electronic components disposed in the top member 902 of the second example connector assembly 108 and operate as a dust cover.

Even though FIGS. 1-10 illustrate connector assemblies (106, 108) having a specific configuration, one of skill in the art can understand and appreciate that other configurations and designs of the connector assembly are within a broader scope of the present disclosure. Other example configurations of a connector assembly of the present disclosure are illustrated in FIGS. 11-23 which will be described below in greater detail.

Figure 11:
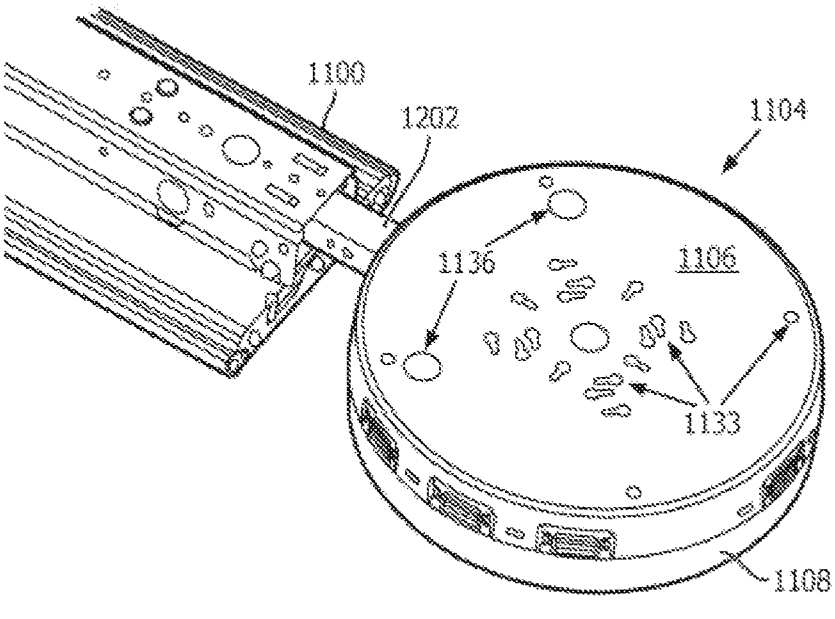
FIG. 11 illustrates an enlarged view of a second example linear luminaire that is connected to a third example connector assembly, in accordance with example embodiments of the present disclosure.
Figure 12:
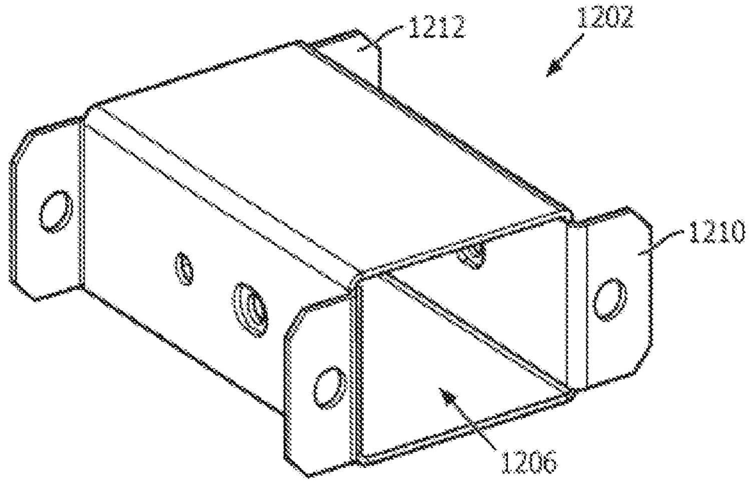
FIG. 12 illustrates a perspective view of a second example coupling bracket that is used to connect the second example linear luminaire to the third example connector assembly, in accordance with example embodiments of the present disclosure.
Figure 13:
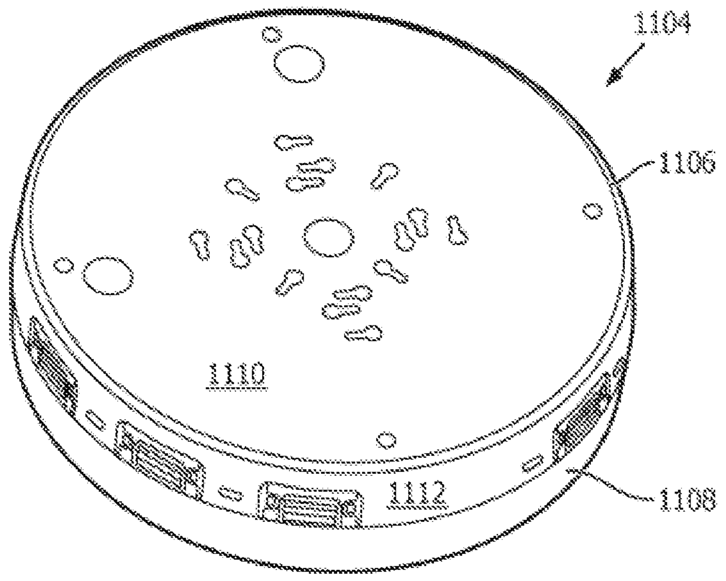
FIG. 13 illustrates a top perspective view of the third example connector assembly, in accordance with example embodiments of the present disclosure.
Figure 14:
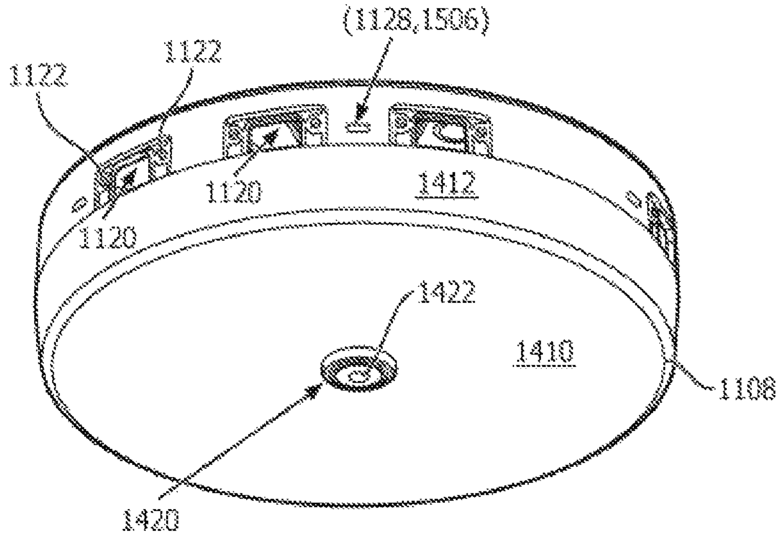
FIG. 14 illustrates a bottom perspective view of the third example connector assembly, in accordance with example embodiments of the present disclosure.

Referring to FIGS. 11-15, a third example connector assembly 1104 may include a top member 1106 and a bottom member 1108. The top member 1106 may include a top wall 1110 and a top side wall 1112 that extends along a perimeter of the top wall 1110. Further, the top side wall 1112 of the top member 1106 may include one or more notches 1120 that are formed therein and a pair of coupling apertures 1122 disposed adjacent each notch 1120. The notches 1120 may be spaced apart from each other and disposed radially around the top side wall 1112 at regular or irregular intervals (e.g., N° increments). The coupling apertures 1122 associated with each notch 1122 may be configured to receive fasteners 1519 therein to connect a coupling bracket 1202 thereto such that a routing channel 1206 defined by the coupling bracket 1202 aligns with the notch 1120 to route electrical conductors from the third example connector assembly 1104 to a linear luminaire 1100 that is coupled thereto or vice-versa via the coupling bracket 1202. As illustrated in FIG. 11, the linear luminaire 1100 may be coupled to the third example connector assembly 1104 via the coupling bracket 1202. The notches 1120 and the pair of coupling apertures 1122 associated with each notch 1120 provide multiple connection points for connecting a linear luminaire 1100 to the third example connector assembly 1104.

Figure 15:
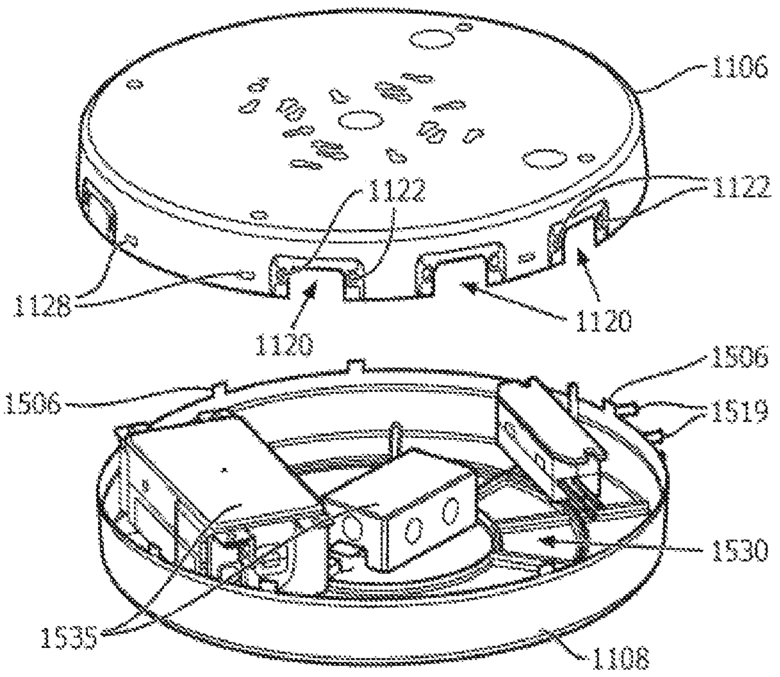
FIG. 15 illustrates an exploded view of the third example connector assembly, in accordance with example embodiments of the present disclosure.

In addition to the notches 1120 and the coupling apertures 1122, the top member 1106 may include through slots 1128 that are configured to receive snap tabs 1506 of the bottom member 1108 to couple the top member 1106 to the bottom member 1108. The top member 1106 may be coupled to the bottom member 1108 of the third example connector assembly 1104 such that they define an accessory cavity 1530 therebetween. The accessory cavity 1530 may be configured to house one or more electronic components 1535 therein as illustrated in FIG. 15. Furthermore, the top member 1106 may include a plurality of mounting apertures 1133 formed in the top wall 1110. The plurality of mounting apertures 1133 may be configured to mount different types of junction boxes and/or provide mounting points for surface mount features and/or suspension mounting features to surface or suspension mount the third example connector assembly 1104. Additionally, the top member 1106 may include routing openings 1136 that are configured to route electrical conductors, such as power lines from an external power supply to the third example connector assembly 1104. For example, power drops may be made to a driver disposed in the connector assembly 1104, and electrical power may be distributed to the different linear luminaires 1100 that are coupled to the connector assembly 1104 in example arrangements such as the ones illustrated in FIGS. 28 and 29. In some example embodiments, such an arrangement of the driver in the connector assembly allows the linear luminaires to be daisy chained to the connector assembly.

The bottom member 1108 may include a bottom wall 1410 and a bottom side wall 1412 that extends substantially perpendicular to the bottom wall 1410 from a perimeter thereof. The bottom wall 1410 may or may not include a sensor aperture 1420 formed therein to receive at least a portion of sensor (e.g., lens 1422 of a sensor) or any other appropriate electronic component therethrough. Further, the bottom wall 1410 may include snap tabs 1506 as described above to couple the bottom member 1108 to the top member 1106.

Figure 16:
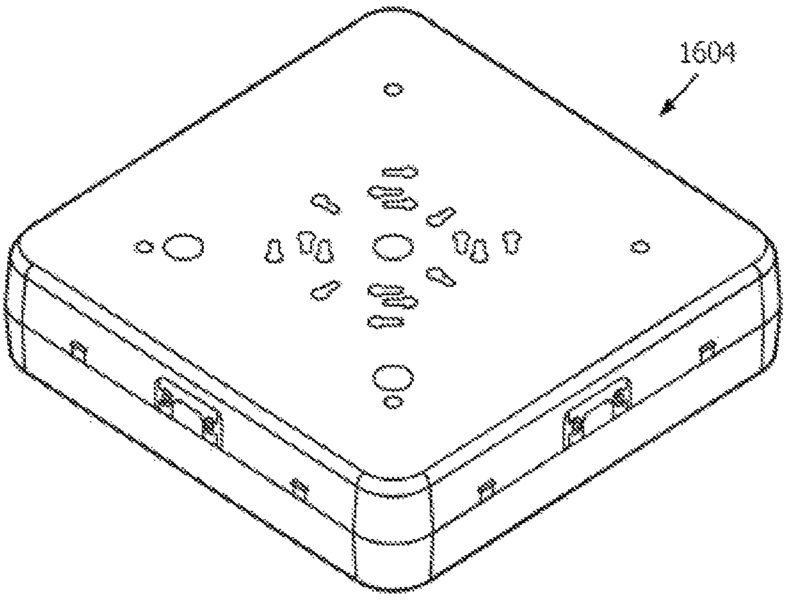
FIG. 16 illustrates a perspective view of a fourth example connector assembly, in accordance with example embodiments of the present disclosure.
Figure 17:
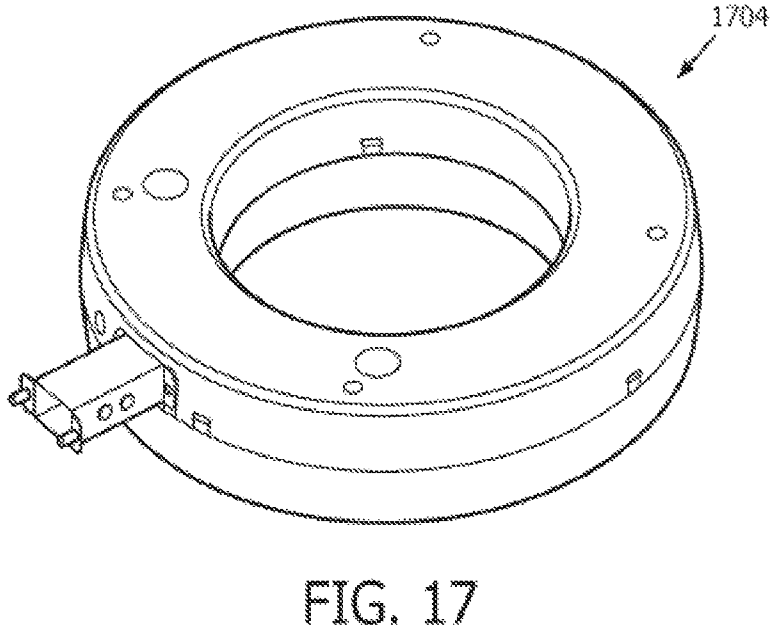
FIG. 17 illustrates a perspective view of a fifth example connector assembly, in accordance with example embodiments of the present disclosure.
Figure 18:
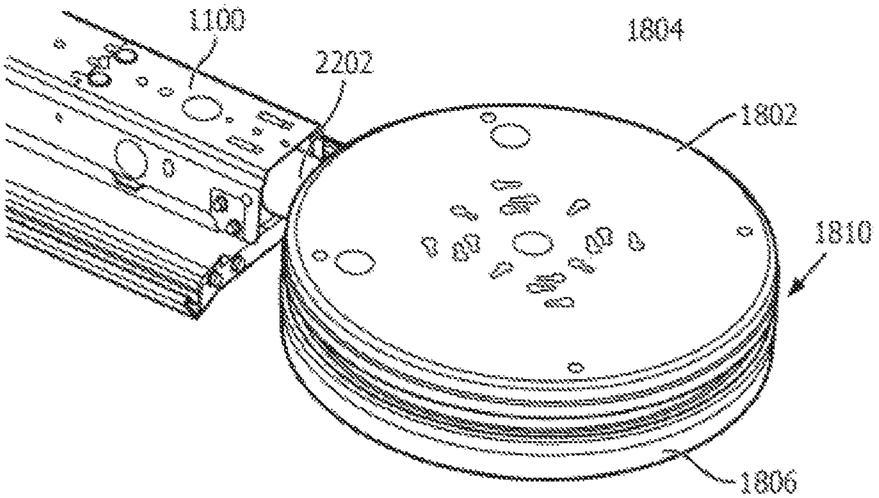
FIG. 18 illustrates an enlarged view of the second example linear luminaire that is connected to a sixth example connector assembly, in accordance with example embodiments of the present disclosure.
Figure 19:
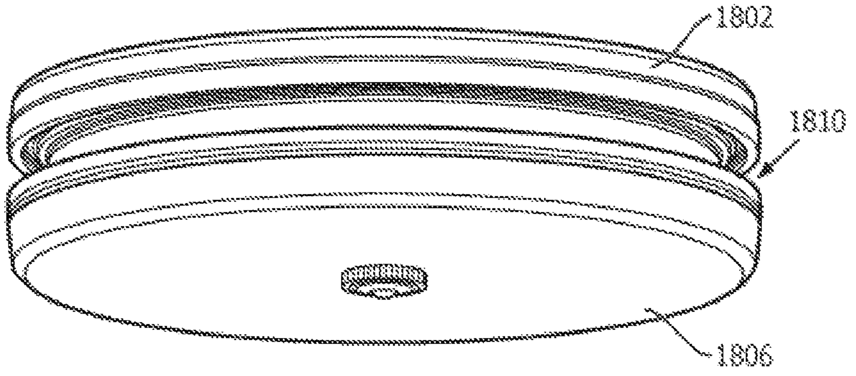
FIG. 19 illustrates a bottom perspective view of the sixth example connector assembly, in accordance with example embodiments of the present disclosure.
Figure 20:
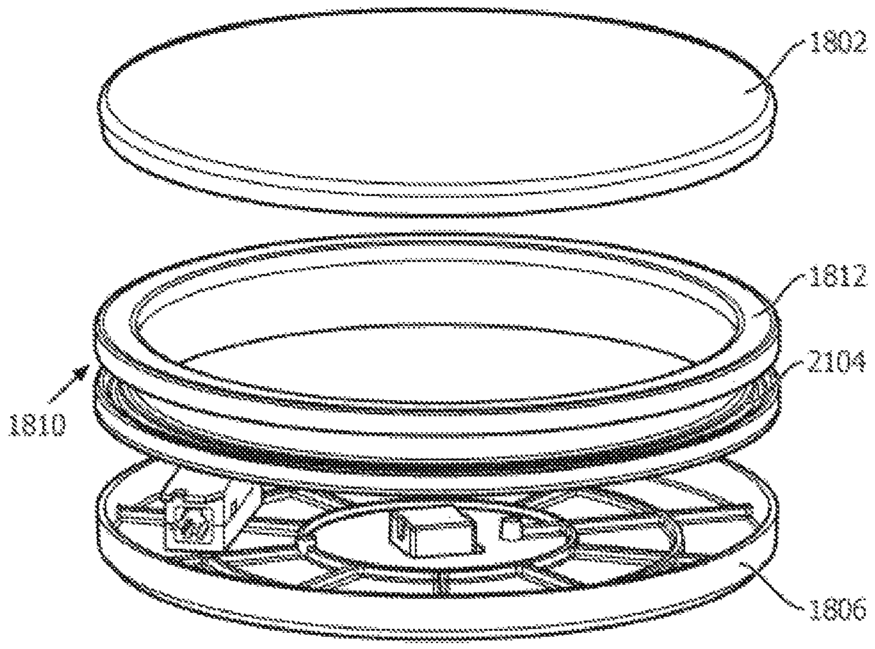
FIG. 20 illustrates an exploded view of the sixth example connector assembly, in accordance with example embodiments of the present disclosure.
Figure 21:
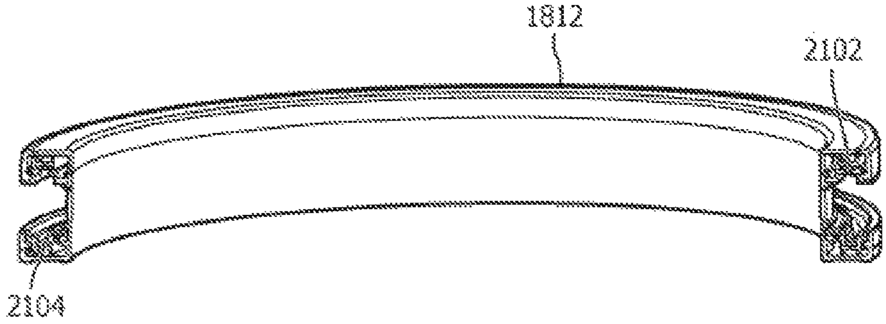
FIG. 21 illustrates a cross section view of a track assembly of the sixth example connector assembly, in accordance with example embodiments of the present disclosure.
Figure 22:
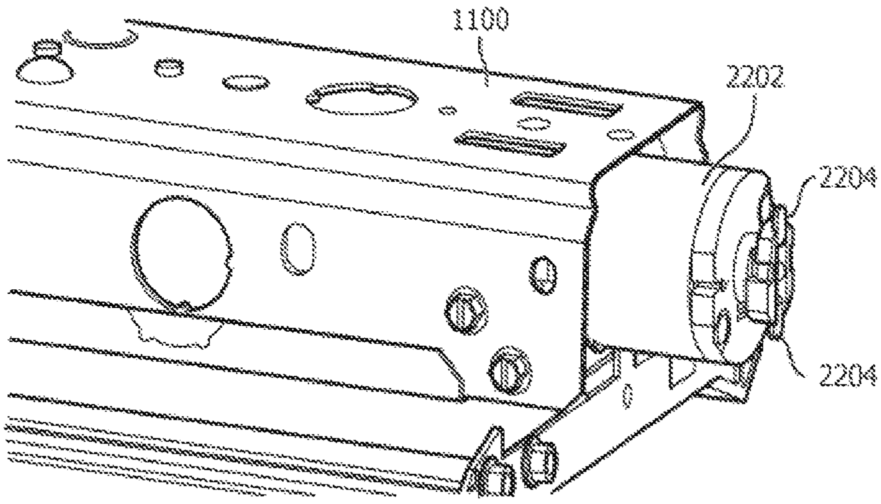
FIG. 22 illustrates an enlarged view of the second example linear luminaire with a track head that is coupled thereto, in accordance with example embodiments of the present disclosure.

Even though FIGS. 11-15 illustrate a connector assembly that is substantially circular, one of skill in the art can understand and appreciate that in other example embodiments, the connector assembly may have any other appropriate shape without departing from a broader scope of the present disclosure. For example, as illustrated in FIGS. 16 and 17, the connector assembly (1604, 1704) may be square shaped or doughnut shaped.

Furthermore, even though FIGS. 1-17 illustrate connector assemblies (106, 108, 1104, 1604, and 1704) that are configured to electrically couple the linear luminaires (100, 1100) that are connected to the connector assemblies (106, 108, 1104, 1604, and 1704) and the electronic components disposed in the connector assemblies (106, 108, 1104, 1604, and 1704) using electrical conductors, one of skill in the art can understand and appreciate that the linear luminaires (100, 1100) and the electronic components disposed in the connector assemblies (106, 108, 1104, 1604, and 1704) can be electrically coupled using other appropriate mechanisms without departing from a broader scope of the present disclosure. For example, the electrical coupling can be achieved using a track assembly as illustrated in FIGS. 18-23.

Figure 23:
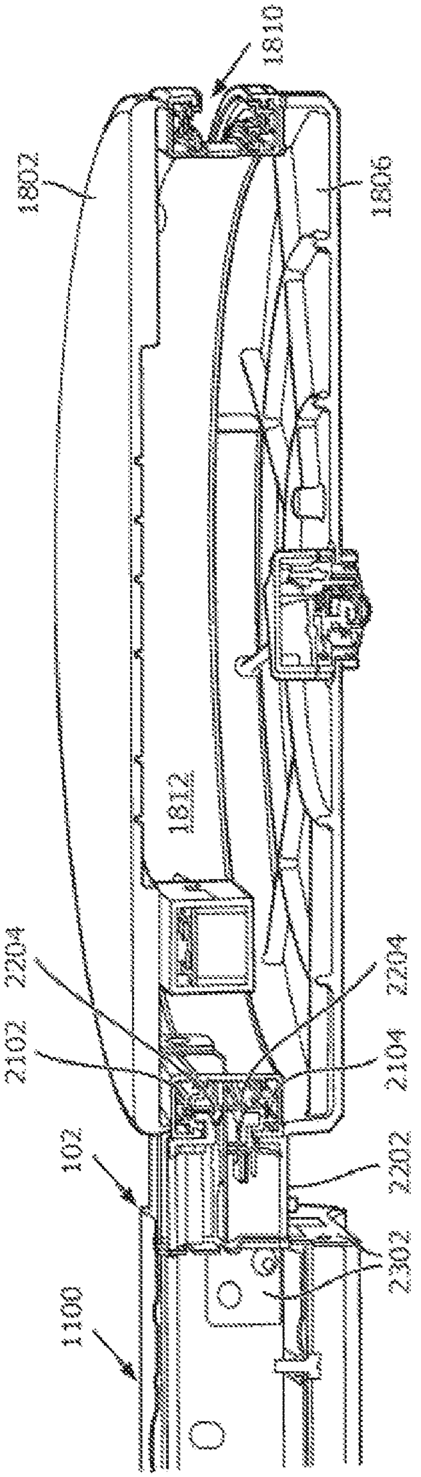
FIG. 23 illustrates a cross-section view of the second example linear luminaire of FIG. 18 that is connected to the sixth example connector assembly via the track head and track assembly, in accordance with example embodiments of the present disclosure.
Figure 24:
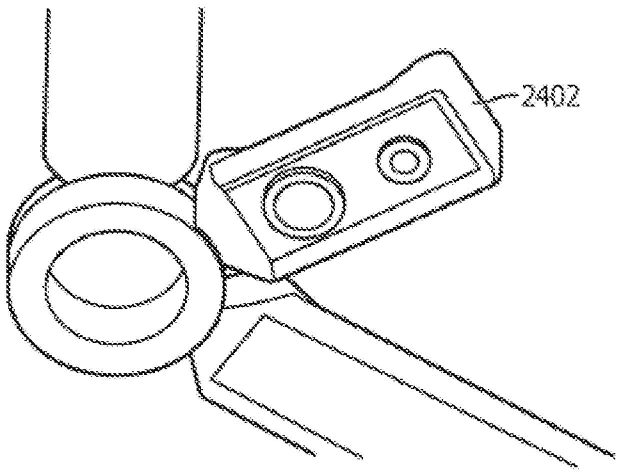
FIG. 24 illustrates a perspective view of an example accessory pan that is connected to the first example connector assembly, in accordance with example embodiments of the present disclosure.

Referring to FIGS. 18-23, a sixth example connector assembly 1804 may include a top member 1802, a bottom member 1806, and a track assembly 1810 that is disposed therebetween. The track assembly 1810 may include an annular track housing 1812 and conductors (2102, 2104) (e.g., copper strips) disposed therein. Electrical power may be supplied to the conductors (2102, 2104). Further, the linear luminaire 1100 may include a track head 2202 that is coupled thereto. The track head 2202 may include metal tabs 2204 that are configured to electrically couple the linear luminaire 1100 to the sixth example connector assembly 1804 when the metal tabs 2204 of the track head 2202 contact the conductors (2102, 2104) in track assembly 1810 as illustrated in FIG. 23. The metal tabs 2204 are also configured to lock the track head 2202 to the track assembly 1810 and secure it in place. The track head 2202 may be inserted into the track assembly 1810 by rotating the track head 2202 such that the metal tabs 2204 are substantially parallel to the conductors (2102, 2104). Once the metal tabs 2204 of the track head 2202 are in the track housing 1812, the track head 2202 may be rotated again such that the metal tabs 2204 are substantially perpendicular to the conductors (2102, 2104), engage the conductors (2102, 2104), and lock the track head 2202 to the track assembly 1810 to physically and electrically couple the linear luminaire 1100 to the sixth example connector assembly 1804.

In some example embodiments, the track assembly 1810 can have additional contacts. That is, the track housing 1812 may have additional conductors and the track head 2202 may have corresponding number of metal tabs 2204 to allow for multiple circuits for normal power supply, emergency power supply, etc., and to allow data signal transmission for dimming and controlling the linear luminaires, for example. In other words, the connector assemblies (106, 108, 1104, 1604, 1704, 1804) may be configured to provide both Class 1 power to the linear luminaires that are connected thereto and Class 2 data transmission, i.e., ability to transmit data between the linear luminaires and the connector assembly when the linear luminaires are connected to the connector assembly (e.g., control signals, dimming signals, etc.).

The track assembly 1810 allows a position of a linear luminaire (100, 1100) that is connected to the connector assembly 1804 to be easily adjusted along the track assembly 1810 without having to detach the linear luminaire (100, 1100) from the connector assembly 1804.

Figure 25:
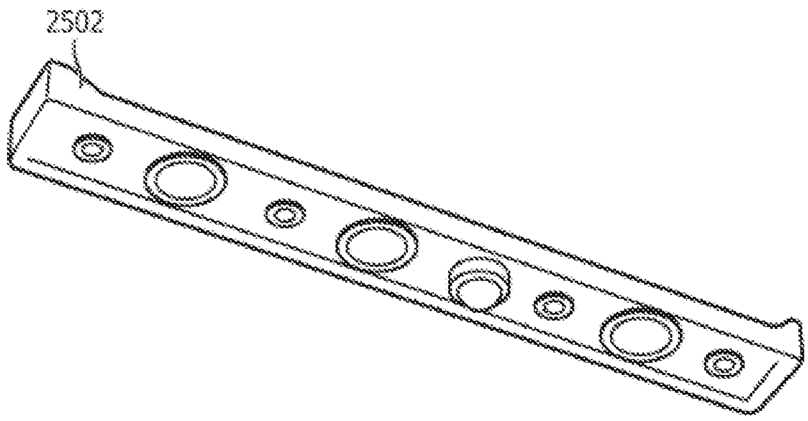
FIG. 25 illustrates a perspective view of two or more accessory pans that are coupled to each other to form a long accessory pan, in accordance with example embodiments of the present disclosure.
Figure 26:
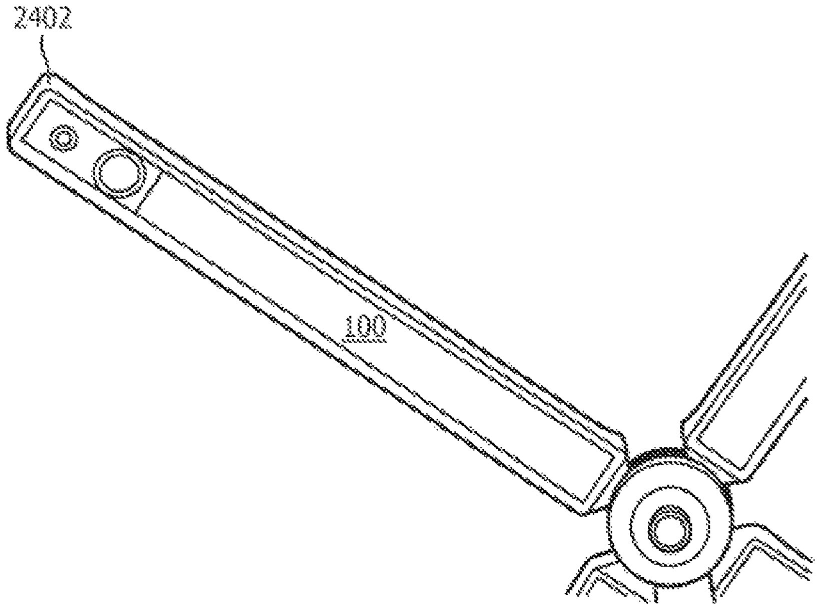
FIG. 26 illustrates a perspective view of an example accessory pan that is coupled end-to-end (row mounted)

The sixth example connector assembly 1804 may be configured to house electronic components therein. In example embodiments where the connector assembly is not configured to house electronic components therein such as the first example connector assembly 106 (open connector assembly), the electronic components may be coupled to the connector assembly using accessory pans 2402. The accessory pan 2402 may be a metal panel that provides space for ancillary electronic devices to be coupled to the connector assembly as illustrated in FIGS. 23-27 and 41. One or more accessory pans 2402 may be coupled together to form a long accessory pan 2502 as illustrated in FIG. 25. The accessory pans 2402 may be coupled directly to the connector assembly as illustrated in FIG. 23 and/or to the linear luminaire (100, 1100) as illustrated in FIG. 26.

The connector assemblies (106, 108, 1104, 1604, 1704, 1804, 4200) described herein may be formed using any appropriate material without departing from a broader scope of the present disclosure. Further, the number of connection points formed in each connector assembly (106, 108, 1104, 1604, 1704, 1804) may differ from the illustrated figures. That is, the connector assemblies (106, 108, 1104, 1604, 1704, 1804) may have fewer or more connection points without departing from a broader scope of the present disclosure. The number of connection points may be limited by the size of the luminaires that are coupled thereto and the shape of the connector assembly. Furthermore, even though the present disclosure describes each connection point has having a pair of mounting apertures, one of skill in the art can understand and appreciate that in other example embodiments, each connection point may include only one mounting aperture or more than two mounting apertures.

Even though FIGS. 1-28 illustrate two different example linear luminaires that are configured to be coupled to the connector assembly (106, 108, 1104, 1604, 1704, 1804 or 4200), one of skill in the art can understand and appreciate that other example linear luminaires that can be coupled to the connector assembly are within the broader scope of the present disclosure. For example, FIGS. 29-40 illustrate example linear luminaires with hinge installation features will be described below in greater detail. The hinge installation features allow quick and easy coupling of a lightguide to an electrical channel of the luminaire, and quick and easy servicing of the linear luminaire and replacement of the lightguide without disassembling of the entire luminaire. As such, the hinge installation features of the linear luminaire may drastically reduce the installation time and servicing time of a linear luminaire which is helpful when many luminaires (e.g., hundreds or thousands of luminaires) are to be installed and/or serviced.

Referring to FIGS. 29-38, the third example linear luminaire 2900 (herein 'linear luminaire 2900') may include a channel assembly 2902, a lightguide assembly 2904, and end caps 2906 that are disposed at the lateral ends (2908, 2910) of the linear luminaire 2900. As illustrated in FIG. 29, the end caps 2906 may be configured to wrap around and cover the ends of the channel assembly 2902 and the lightguide assembly 2904. The lightguide assembly 2904 may be configured to be coupled to the channel assembly 2902 using hinge installation features 3002. The hinge installation features 3002 may include a lightguide hinge bracket 3004 and a channel hook bracket 3006 that are configured to couple the lightguide assembly 2904 to the channel assembly 2902.

Figure 7:
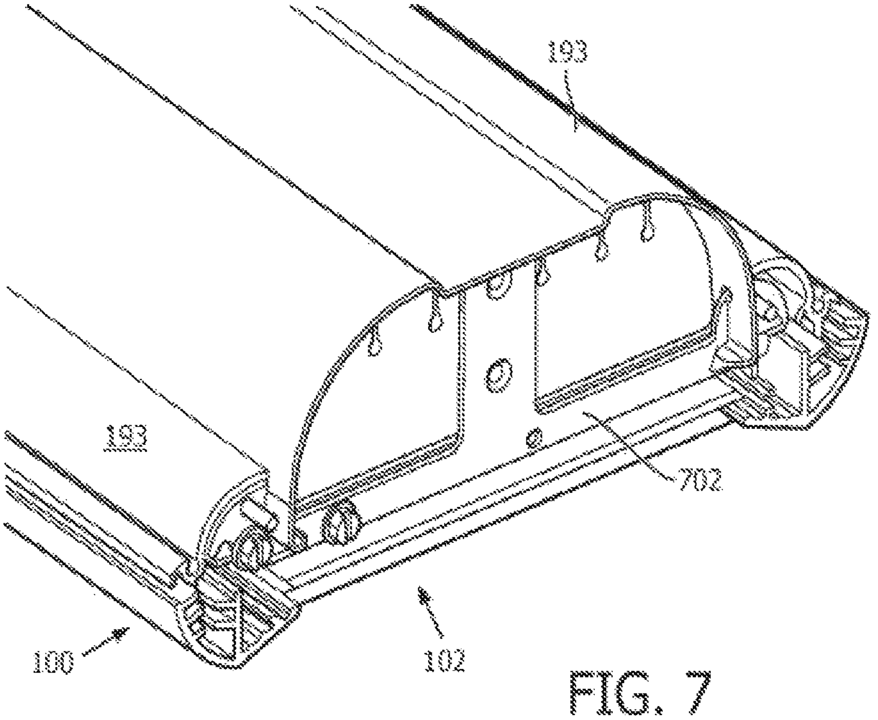
FIG. 7 is an enlarged view of an end of the first example linear luminaire with the end cap removed therefrom to illustrate an example T-bridge to which the first example coupling bracket mounts, in accordance with example embodiments of the present disclosure.

The lightguide assembly 2904 may include two side rails 3008, a light transmission unit 3010 that is disposed and securely retained between the two side rails 3008, and the lightguide hinge brackets 3004 that are disposed at and coupled to the lateral ends (3108, 3110) of the side rails 3008. As illustrated in FIG. 36, each side rail 3008 may include an elongate member 3602 that defines a retention cavity 3604. The retention cavity 3604 is configured to house a light source (not shown in the figures) therein and receive an end (long end) of the light transmission unit therein such that an edge of a lightguide panel 3702 of the light transmission unit 3010 faces the light source. Further, the elongate member 3604 of each side rail 3008 may include a geometry 3611 that defines a screw mount attachment cavity 3606 that is configured to receive a fastener 3050 (e.g., screw) therein to couple the lightguide hinge bracket 3004 to the side rails 3008 as illustrated in FIG. 30. In other example embodiments, any other appropriate brackets may be coupled to the side rails 3008. For example, a T-bridge bracket 702 may be coupled to the side rails 3008 as illustrated in FIG. 7. Furthermore, the elongate member 3604 of each side rail 3008 may include heat sink fins 3610.

The heat sink fins 3610 may be double duty fins that are configured to dissipate heat and to provide a mounting location to mount any appropriate accessories to the linear luminaire 2900. One such accessory may include, but is not limited to, an alignment bar 193 (shown in FIGS. 1 and 7). The alignment bar 193 may include extrusions (not shown in the figures) are configured to be coupled to the linear luminaire 2900 by sliding into and engaging the heat sink fins 3610. The alignment bar 193 may be configured as moving mounting location for attaching an end of a suspension cable that is used to suspension mount the linear luminaire 2900. In other words, the side rails 3008 may be configured to: (a) provide mounting locations for accessories, (b) provide heat dissipation, (c) provide fastener receiving cavities to couple the lightguide hinge bracket 3004 to the luminaire, and (d) securely retain the light transmission unit 3010.

The light transmission unit 3010 may include the lightguide panel 3702 that has two major surfaces 3706 and 3708 that are disposed opposite to each other, and a side edge that extends therebetween and along a perimeter of the lightguide panel 3702. As described above, a long end of the light transmission unit 3702 may be disposed in the retention cavity 3604 defined by a side rail 3008 such that the light source that is housed in the retention cavity 3604 faces the side edge 3710 of the lightguide panel 3702. Light from the light source may enter the lightguide panel 3702 through the edge and may be directed to an opposite long edge of the lightguide panel 3702 through total internal reflection between the two major surfaces (3706, 3708). The major surfaces (3706, 3708) may be patterned with microlenses or microetchings that promote controlled release of light internally incident on those major surfaces (3706, 3708).

Further, the light transmission unit 3010 may include a reflector panel 3704 that is disposed above the lightguide panel 3702 on one of the major surfaces (3706 or 3708). The reflector panel 3704 may be configured to reflect light that exits through the major surface (3706 or 3708) of the lightguide panel 3702 on which the reflector panel 3704 is disposed back towards the lightguide panel 3702 such that the light exits through the major surface (3706 or 3708) that faces an area to be illuminated. The light that exist through the major surface (3706, 3708) that faces the area to be illuminated can provide beneficial illumination for the area that may be occupied by one or more people, for example. In some example embodiments, the light transmission unit 3010 may not include the reflector panel 3704. The reflector panel 3704 may be removed from the light transmission unit 3010 to provide an uplight, for example. The light transmission unit 3010 may also optionally include a diffuser lens that is attached to the lightguide panel 3702 such that the lightguide panel 3702 is disposed between the diffuser lens and the reflector panel 3704.

As illustrated in FIG. 35, the lightguide hinge bracket 3004 may include a first coupling aperture 3502 and two hinge arms 3504 that are disposed on opposite ends of the lightguide hinge bracket 3004. Further, each hinge arm 3504 may include a screw attachment hole 3506. As illustrated in FIGS. 30 and 31, the screw attachment hole 3506 of each hinge arm 3504 of the lightguide hinge bracket 3004 may be axially aligned with a screw mount attachment cavity 3606 of a corresponding side rail 3008. A fastener 3050 (e.g., screw) may be passed through the axially aligned screw attachment hole 3506 of the lightguide hinge bracket 3004 and the screw mount attachment cavity 3606 of the side rail 3008 to couple the lightguide hinge bracket 3004 to the side rails 3008 that securely retain the light transmission unit 3010 therebetween. The lightguide hinge bracket 3004 may be configured to hold the side rails 3008 together with the light transmission unit 3010 retained therebetween to form the lightguide assembly 2904 that moves and/or operates as a single unit.

As illustrated in FIGS. 32 and 33, the channel assembly 2902 may include an electrical channel 2901 that defines an internal cavity that is configured to house electronic components therein (e.g., driver). The electrical channel 2901 comprises a top cover 3202, a bottom cover 3204 that is snapped onto the top cover 3202, and end plates 3206 that are coupled to the lateral ends (3208, 3210) of the top cover 3202 using fasteners 3012 to cover the lateral ends (3208, 3210) of the electrical channel 2901. Further, the channel assembly 2902 may include the channel hook bracket 3006 that is coupled to the lateral ends (3208, 3210) of the top cover 3202 using fasteners 3014.

As illustrated in FIG. 34, the channel hook bracket 3006 may include a body 3401 that comprises a second coupling aperture 3402 formed therein. Further, the channel hook bracket 3006 may include two hook arms 3404 that extend substantially perpendicular to the body 3401 from opposite ends of the body 3401. Furthermore, the channel hook bracket 3006 may include two seat structures 3406 that extend substantially perpendicular to the body 3401 from a top edge thereof and in a direction opposite to that of the hook arms 3404. The seat structures 3406 may include attachment apertures 3412 that are configured to receive fasteners 3014 therethrough to couple the channel hook bracket 3006 to the electrical channel 2901 such that: (a) the bottom cover 3204 and/or the end plates 3206 of the electrical channel 2901 rests on a portion of the seat structures 3406, and (b) the body 3401 of the channel hook bracket 3401 extends below the bottom cover 3204.

As illustrated in FIG. 38, to install the linear luminaire 2900, an installer will first hook the lightguide assembly 2904 onto the channel assembly 2902 by engaging one hinge arm 3504 of the lightguide hinge bracket 3004 on each lateral end (3108, 3110) of the lightguide assembly 2904 with one hook arm 3404 of the channel hook bracket 3006 on each lateral end (3208, 3210) of the channel assembly 2902. The lightguide assembly 2904 that is hooked to the channel assembly 2902 as described above will hang from the channel assembly 2902. Then, the lightguide assembly 2904 that is hanging from the channel assembly 2902 may be rotated towards the bottom cover 3204 of the channel assembly 2902 and adjusted (e.g., shifted horizontally) such that: (a) an opposite hinge arm 3504 of the lightguide hinge bracket 3004 on each lateral end of the lightguide assembly 2904 engages the opposite hook arm 3404 of the channel hook bracket 3006 on each lateral end (3208, 3210) of the channel assembly 2902, and (b) the first coupling aperture 3502 of the lightguide hinge bracket 3004 is axially aligned with the second coupling aperture 3402 of the channel hook bracket 3006. Responsively, the installer may lock the lightguide assembly 2904 and the channel assembly 2902 in place by passing a fastener 3020 (e.g., screw) through the axially aligned first and second coupling apertures (3502, 3402) of the lightguide hinge bracket 3004 and the channel hook bracket 3006.

Similarly, when one hinge arm 3504 of the lightguide hinge bracket 3004 is disengaged from a corresponding hook arm 3404 of the channel hook bracket 3006 at each lateral end of the linear luminaire 2900, the lightguide assembly 2904 swings open and hangs vertically from the channel assembly 2902, thereby providing access to the electrical channel 2901 for servicing. Further, an existing lightguide assembly may be replaced by a new or updated lightguide assembly by disengaging the existing lightguide assembly from the channel assembly and attaching the new lightguide assembly to the channel assembly as described above.

Further, some example linear luminaires may include covers that are disposed over and conceal the electrical channel 2991 such as the cover 3902 of the fourth example linear luminaire 3900 and the cover 4002 of the fifth example linear luminaire 4000.

FIGS. 41 and 43 illustrates an example arrangement of five of a sixth example linear luminaires connected to the seventh example connector assembly 4200. The connector assembly 4101 being coupled to a lateral end (4102, 4104) of the modular linear luminaire 4100, one of skill in the art can understand and appreciate that in other example embodiments, similar connector assemblies may be coupled to the opposite lateral ends (4102, 4104) of the modular linear luminaire 4100. As described above, the connector assembly 4200 also allows for various wiring schemes in linear suspended lighting continuous runs. As shown in FIG. 41, the modular linear luminaire 4100 may be suspended using, for example, a stainless steel cable or rigid tubular pendant stem and if necessary, provided with main power via a power cord (not shown).

The connector assembly 4101 that is illustrated in FIG. 41 may be a cylindrical connector assembly that comprises a central portion that extends therethrough. The connector assembly 4106 will be described below in further detail in association with FIGS. 42-43. Referring to FIGS. 42-43, the connector assembly 4106 may include a housing 4201. The housing 4201 may include a bottom member (not shown) and a top member 4202 that is coupled thereto. The top member or track 4202 may be a plurality of flat surfaces or a continuous track around the top surface of housing 4201. The housing 4202 forms a structural mount for the modular linear luminaires (4106) (hereinafter 'linear luminaires'). That is, the linear luminaires (4106) may be coupled to the housing 4202 of the fourth example connector assembly 4102 using the coupling brackets 4108, shown in detail in FIGS. 42 and 43.

The coupling brackets 4108 include one or more hook brackets 4110 that are hung or coupled to the top member or track 4202 of housing 4201 via the hooks 4111, as shown in FIG. 43. The one or more hooks 4110 are movably connected to a luminaire coupling bracket 4112 via a movement mechanism, for example, as shown in FIGS. 42 and 43, by screws 4115 that when turned move the one or more luminaire coupling brackets 4212 in an up or down or vertical direction in relation to the hook bracket 4210. The hooks 4111 also allow for the linear luminaires 4106 to be rotated or moved horizontally around the top member or track 4202 of the connector assembly 4101. Other movement mechanisms in place of the screws are also possible including for example, peg/hole arrangements, fasteners, glue, etc.

As shown in FIG. 43, the one or more hook bracket 4110 may also include one or more slots 4114 (alternative to or to work with the screw 4115) that engage with the luminaire coupling bracket (for example with protrusions or pins on the luminaire coupling bracket, not shown) to the provide the movement mechanism or to help guide the movement of the one or more hook brackets 4110 and provide further stability.

The luminaire coupling bracket 4112 may also include one or more sloped side members 4216 to help support the linear luminaires 4106, wherein the linear luminaires 4106 include a corresponding sloped side members (not shown) on the lateral ends (4102, 4104) to mate with the one or more sloped side members (4216) of the luminaire coupling bracket 4112. The luminaire coupling bracket 4112 may also include one or more screws 4216 to further hold the coupling brackets 4108 and linear luminaires 4100 in place.

Once the linear luminaires 4106 are installed onto the connector assembly 4101 and the height of the hook brackets 4111 is adjusted, a final bracket (shown in FIG. 41) is coupled to the linear luminaire 4106. coupling bracket 4108 and housing 4201.

The connector assembly 4101 and coupling brackets 4108 allow for linear luminaires of different heights and different shapes to be attached to the connector assembly 4101, as well as to allow the linear luminaires 4106 to be rotated to predetermine or desired angle around the connector assembly 4101, via the adjustable mechanism of the coupling bracket 4108.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A connector assembly comprising:
- a housing that defines an internal cavity that is configured to house one or more electronic components therein;
- a track disposed radially around a top of the housing 1 forming a plurality of connection points on the housing to couple luminaires thereto such that the luminaires extend radially outward from the housing and at least two of the luminaires define a non-perpendicular and non-zero angle therebetween, and
- a coupling bracket having a hook bracket having at least one hook, and a luminaire coupling bracket, wherein the coupling bracket is hung or coupled to the track of the housing using the at least one hook, wherein the hook bracket is movably coupled to the luminaire and is configured to enable vertical movement of the luminaire coupling bracket in relation to the hook bracket, and
- wherein the luminaires are coupled to the luminaire coupling bracket.

2. The connector assembly of claim 1, wherein the non-perpendicular and non-zero angle is one of an acute angle, an obtuse angle, and a reflex angle.

3. The connector assembly of claim 1, wherein the housing comprises a top member and a bottom member that are configured to be coupled to each other.

4. The connector assembly of claim 3, wherein the top member defines the internal cavity.

5. The connector assembly of claim 3, wherein the combination of the top member and the bottom member defines the internal cavity.

6. The connector assembly of claim 1, wherein the movement mechanism includes a screw that when turned moves the luminaire coupling bracket in an up or down/vertical direction in relation to the hook coupling bracket.

7. The connector assembly of claim 1, wherein the movement mechanism includes one or more slots on the hook bracket that enables the luminaire coupling bracket to move in an up or down/vertical direction in relation to the hook coupling bracket.

8. The connector assembly of claim 3, wherein the hooks further enable the linear luminaires to be rotated or moved horizontally around the track of the connector assembly.

9. The connector assembly of claim 3, wherein the luminaire coupling bracket further includes one or more sloped side members to support the linear luminaires, and wherein the linear luminaires include one or more corresponding sloped side members on lateral ends to mate with the one or more sloped side members of the luminaire coupling bracket.

10. The connector assembly of claim 1, wherein the one or more electronic components comprise at least one of a driver, a sensor, a camera, a smart speaker, a wireless communication module, and an emergency battery pack.

11. The connector assembly of claim 1, wherein the housing is configured to be surface mounted.

12. The connector assembly of claim 1, wherein the housing is configured to be suspension mounted.

* * * * *